(12) United States Patent
Knarr et al.

(10) Patent No.: US 11,978,371 B2
(45) Date of Patent: May 7, 2024

(54) MOBILE DEVICE WITH A FOLDABLE DISPLAY AND METHOD OF PROVIDING USER INTERFACES ON THE FOLDABLE DISPLAY

(71) Applicant: Samsung Electronics Co., Ltd., Suwon-si (KR)

(72) Inventors: Duncan Knarr, Santa Rosa, CA (US); Andrew R McHugh, San Jose, CA (US); Seokhyun Yoon, Cupertino, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 19 days.

(21) Appl. No.: 17/814,465

(22) Filed: Jul. 22, 2022

(65) Prior Publication Data

US 2022/0358857 A1    Nov. 10, 2022

Related U.S. Application Data

(63) Continuation of application No. 16/569,291, filed on Sep. 12, 2019, now Pat. No. 11,398,168.

(60) Provisional application No. 62/828,893, filed on Apr. 3, 2019.

(51) Int. Cl.
  *H05K 7/00*  (2006.01)
  *G06F 1/16*  (2006.01)
  *G09F 9/30*  (2006.01)

(52) U.S. Cl.
  CPC ............ *G09F 9/301* (2013.01); *G06F 1/1626* (2013.01); *G06F 1/1643* (2013.01); *G06F 1/1652* (2013.01)

(58) Field of Classification Search
  CPC ...... G06F 9/301; G06F 1/1626; G06F 1/1643; G06F 1/1652
  USPC ..................................... 361/679.27
  See application file for complete search history.

(56) References Cited

U.S. PATENT DOCUMENTS

| 2012/0081308 A1* | 4/2012 | Sirpal | G06F 3/0488 345/173 |
| 2012/0084694 A1* | 4/2012 | Sirpal | G06F 3/04812 715/769 |
| 2013/0215041 A1* | 8/2013 | Kim | G06F 1/1694 345/173 |
| 2015/0227236 A1* | 8/2015 | Lee | G06F 3/04883 345/174 |
| 2016/0179236 A1* | 6/2016 | Shin | G06F 1/1652 345/173 |

* cited by examiner

*Primary Examiner* — Jonathan M Blancha

(57) ABSTRACT

A system and method for controlling presentation on a foldable display of an electronic device is provided. A foldable electronic device comprises a foldable housing including a hinge structure, a first housing structure and a second housing structure foldable and unfoldable with respect to the first housing structure about the hinge structure. The electronic device includes a processor and a memory to store instructions that cause the processor to receive a first user input to select an application program; detect a change from a folded state to an unfolded state; determine whether the selected application program has user interface size restrictions; and in the unfolded state, display a user interface of the selected application on at least a portion of the foldable display, based in part on the screen size restriction.

20 Claims, 20 Drawing Sheets

Restrict your app for tablets or TVs only

You can prevent handset devices from downloading your app by using the `<supports-screens>` manifest element.

For example, the following declares that only large and xlarge screens should install your app:

```
<manifest ... >
    <supports-screens android:smallScreens="false"
                      android:normalScreens="false"
                      android:largeScreens="true"
                      android:xlargeScreens="true"/>
    ...
</manifest>
```

FIGURE 4

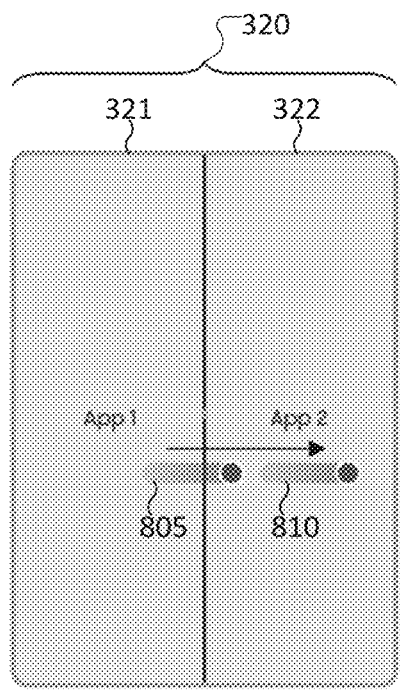 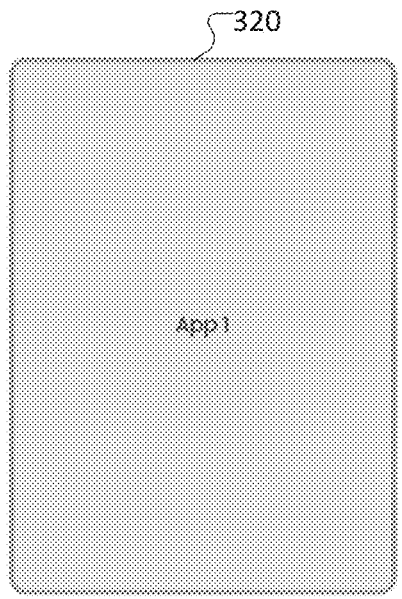
FIGURE 8A  FIGURE 8B
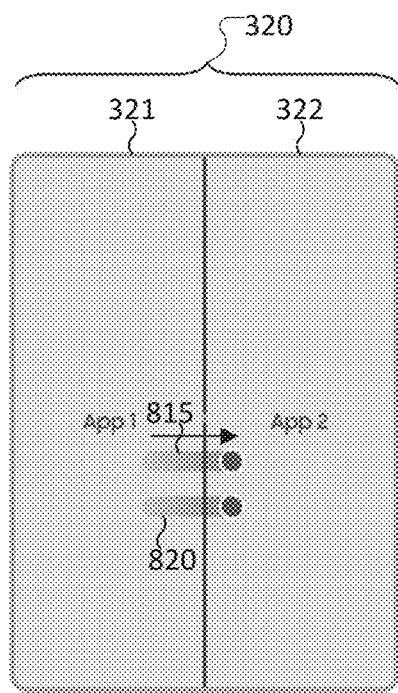 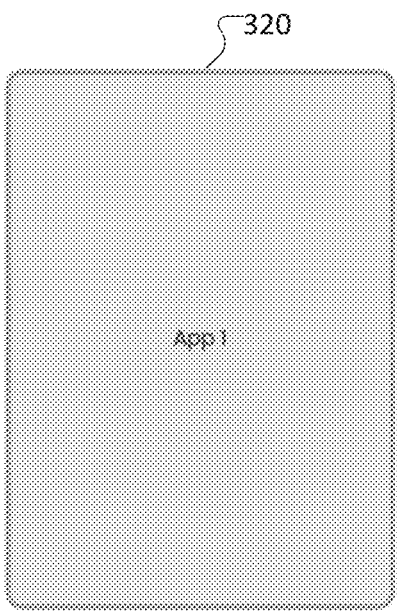
FIGURE 8C  FIGURE 8D

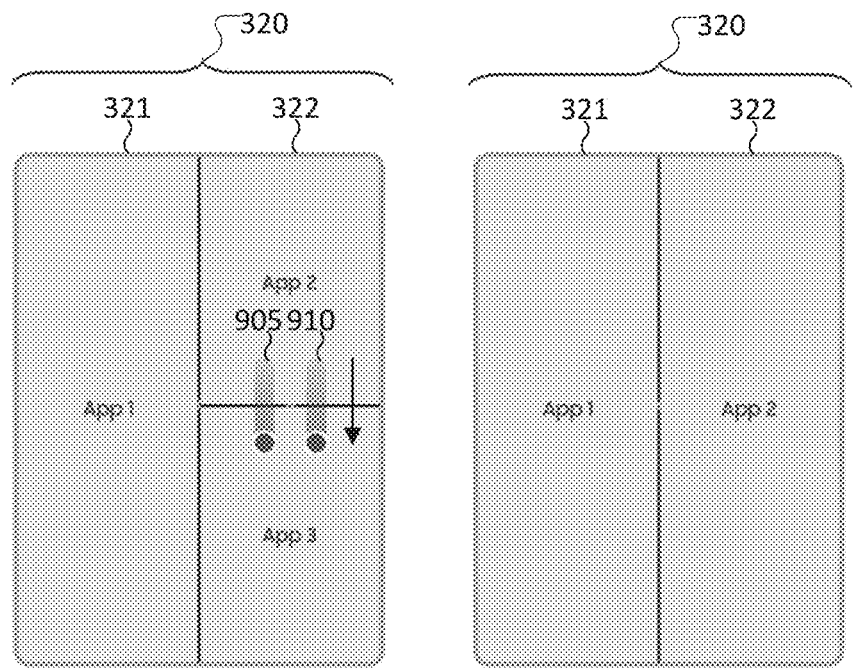
FIGURE 9A
FIGURE 9B
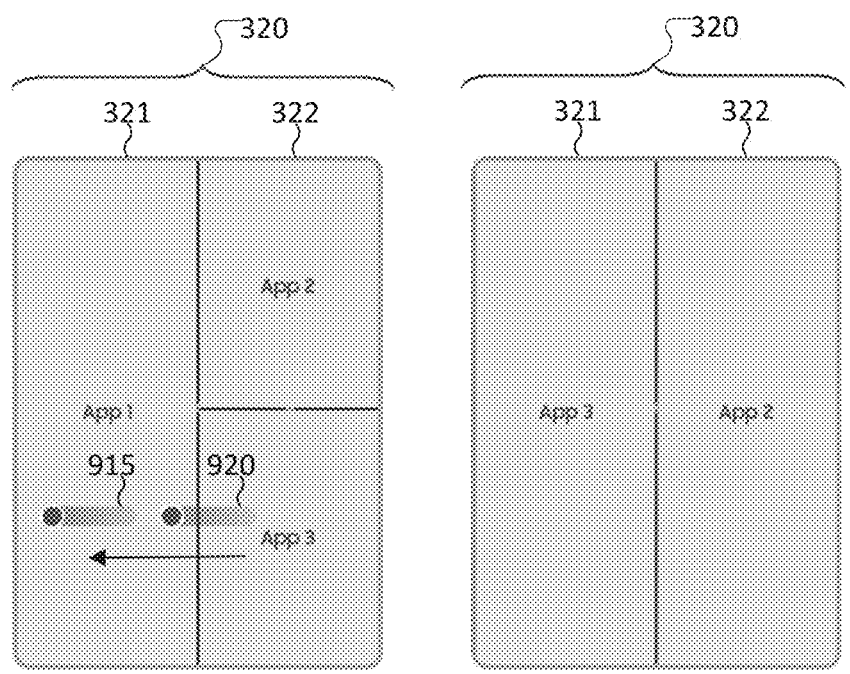
FIGURE 9C
FIGURE 9D

MOBILE DEVICE WITH A FOLDABLE DISPLAY AND METHOD OF PROVIDING USER INTERFACES ON THE FOLDABLE DISPLAY

CROSS-REFERENCE TO RELATED APPLICATION AND PRIORITY CLAIM

This application claims priority under 35 U.S.C. § 120 as a continuation of U.S. patent application Ser. No. 16/569,291 filed on Sep. 12, 2019 (now U.S. Pat. No. 11,398,168), which claims priority under 35 U.S.C. § 119(e) to U.S. Provisional Patent Application No. 62/828,893 filed on Apr. 3, 2019. Both of these applications are hereby incorporated by reference in their entirety.

TECHNICAL FIELD

This disclosure relates generally to an electronic device and more specifically, to a mobile device with a foldable display and a method for providing user interfaces on such a foldable display.

BACKGROUND

Mobile electronic devices, such as mobile phones are evolving to include various configurations. One such configuration is a foldable mobile phone including a foldable display area. The foldable display area provides a larger screen for interactions and the ability to display multiple applications at once.

SUMMARY

This disclosure provides an apparatus and method for a user interface. The apparatus may be an electronic device with a foldable display that can provide a user interface for controlling presentation of applications depending on application type, device context, or time between when the device changes screen sizes.

In a first embodiment, an electronic device comprising a foldable housing including a hinge structure, a first housing structure coupled to the hinge structure and a second housing structure coupled to the hinge structure. The second housing structure is foldable and unfoldable with respect to the first housing structure about the hinge structure. When the second housing structure is folded onto the first housing structure the electronic device is in a folded state and when the second housing structure forms a substantially planar surface with the first housing structure the electronic device is in an unfolded state. The electronic device includes a foldable display including a first portion positioned in the first housing structure and a second portion positioned in the second housing structure. The electronic device includes a processor, operatively connected to the foldable display and a memory operatively connected to the processor. The memory stores at least one application program and stores instructions that when executed cause the processor to receive a first user input to select an application program; detect a change from the folded state to the unfolded state; determine whether the selected application program has a user interface size restriction; and in the unfolded state, display a user interface of the selected application on at least a portion of the foldable display, based in part on the screen size restriction.

In a second embodiment, an electronic device comprising a foldable housing including a hinge structure, a first housing structure coupled to the hinge structure and a second housing structure coupled to the hinge structure. The second housing structure is foldable and unfoldable with respect to the first housing structure about the hinge structure. When the second housing structure is folded onto the first housing structure the electronic device is in a folded state and when the second housing structure forms a substantially planar surface with the first housing structure the electronic device is in an unfolded state. The electronic device includes a foldable display including a first portion positioned in the first housing structure and a second portion positioned in the second housing structure. The electronic device includes a processor, operatively connected to the foldable display at least one sensor operatively connected to the processor and a memory operatively connected to the processor. The memory stores instructions that when executed cause the processor to receive a first user input that causes a first user interface to be displayed in the folded state; detect a change from the folded state to the unfolded state; select a second user interface based at least partly on at least one context parameter; and in the unfolded state, display the first user interface and the second user interface on at least a portion of the foldable display.

In a third embodiment, an electronic device comprising a foldable housing including a hinge structure, a first housing structure coupled to the hinge structure and a second housing structure coupled to the hinge structure. The second housing structure is foldable and unfoldable with respect to the first housing structure about the hinge structure. When the second housing structure is folded onto the first housing structure the electronic device is in a folded state and when the second housing structure forms a substantially planar surface with the first housing structure the electronic device is in an unfolded state. The electronic device includes a foldable display including a first portion positioned in the first housing structure and a second portion positioned in the second housing structure. The electronic device includes a processor, operatively connected to the foldable display and a memory operatively connected to the processor. The memory stores at least one application program and stores instructions that when executed by the processor cause the processor to display a first user interface in a first size of a first application program on the foldable display in the unfolded state; detect a first change from the unfolded state to the folded state; after detecting the first change, detect a second change from the folded state to the unfolded state; after detecting the second change, determine a length of time between the first change and the second change; if the length of time is within a selected period of time, display the first user interface in the first size on the foldable display in the unfolded state; if the length of time exceeds the selected period of time, display the first user interface in a second size different from the first size on the foldable display in the unfolded state, or not display the first user interface on the foldable display in the unfolded state.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B.

As used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such SAMSUNG HOMESYNC, APPLETV, or GOOGLE TV), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description, taken in conjunction with the accompanying drawings, in which:

FIG. 4 illustrates an example for how applications can restrict the display sizes that are supported in a manifest file according to embodiments of this disclosure;

FIGS. 8A, 8B, 8C and 8D illustrate examples of multi-touch inputs for changing from a dual screen view to a full screen view according to embodiments of this disclosure;

FIGS. 9A, 9B, 9C and 9D illustrate examples for moving from a three screen view to a two screen view where the starting point of the multi-touch input gesture indicates which application to retain according to embodiments of this disclosure;

DETAILED DESCRIPTION

FIGS. 1 through 15 discussed below, and the various embodiments used to describe the principles of this disclosure in this patent document are by way of illustration only and should not be construed in any way to limit the scope of the disclosure. Those skilled in the art will understand that the principles of this disclosure can be implemented in any suitably arranged system.

This disclosure generally provides an apparatus and method for a user interface. According to embodiments of this disclosure an electronic device is a mobile device with a foldable display that can provide a user interface for controlling and displaying applications depending on application type, device context, or time between the device changes screen sizes.

Figure 1:
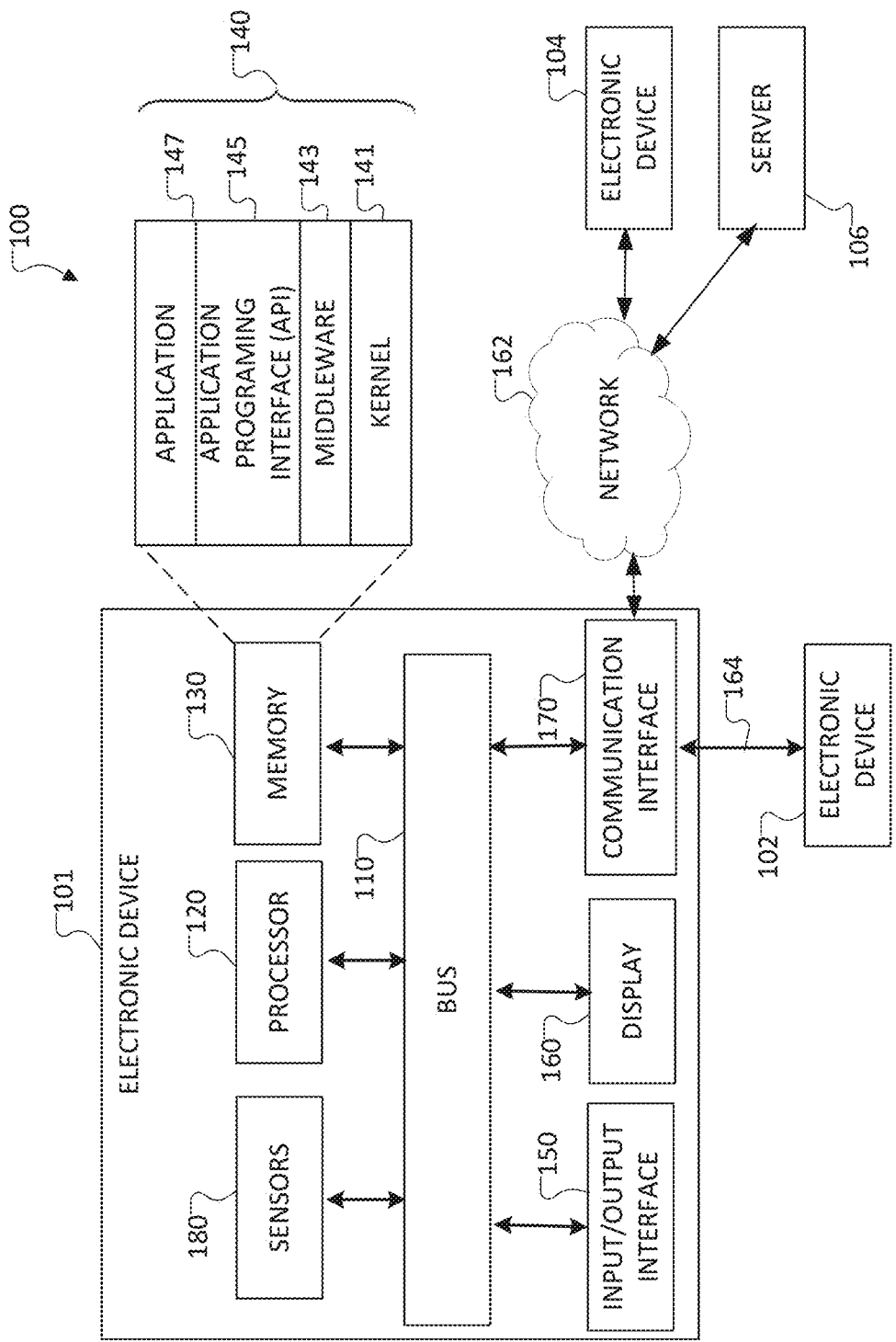
FIG. 1 illustrates an example of a network environment according to an embodiment of this disclosure.

FIG. 1 illustrates an example of a network environment 100 according to an embodiment of this disclosure. The embodiment of the network environment 100 shown in FIG. 1 is for illustration only. Other embodiments of the network environment 100 could be used without departing from the scope of this disclosure.

According to an embodiment of the present disclosure, an electronic device 101 is included in a network environment 100. The electronic device 101 can include at least one of a bus 110, a processor 120, a memory 130, an input/output (IO) interface 150, a display 160, a communication interface 170, or sensors 180. In some embodiments, the electronic device 101 can exclude at least one of the components or can add another component.

The bus 110 includes a circuit for connecting the components 120 to 170 with one another and transferring communications (e.g., control messages and/or data) between the components.

The processor 120 includes one or more of a central processing unit (CPU), an application processor (AP), or a communication processor (CP). The processor 120 is able to perform control on at least one of the other components of the electronic device 101, and/or perform an operation or data processing relating to communication.

For example, the processor 120 is able to detect the device state of the electronic device 101. The processor 120 can detect when the foldable electronic device 101 is in a folded or closed state. The processor 120 is also able to detect when the foldable electronic device 101 is in an unfolded or open state. For example, the processor 120 can to receive information from a variety of sensors and use the information to determine whether or not the electronic device 101 is in a closed state.

The processor 120 is able to receive an input selection of an application and determine how to display the user interface of the application on a foldable display of the electronic device 101. The processor 120 can also determine how to display multiple user interfaces of multiple applications on the foldable display of the electronic device 101. The processor 120 can receive input to rearrange and manipulate the display of the user interfaces of the applications and respond. The processor 120 responds to the input by rearranging and reformatting the display of the user interfaces of the applications on the foldable display of the electronic device 101. The processor is also able to determine an amount of time between the electronic device 101 going from an unfolded state to a folded state and back to an unfolded state in order to determine a display configuration for the foldable display of the electronic device 101.

The memory 130 can include a volatile and/or non-volatile memory. For example, the memory 130 can store commands or data related to at least one other component of the electronic device 101. In various embodiments, the memory 130 can store spatial map data that can include mapping information of a real environment such as the interior of an office building, mall, house, amusement park, neighborhood or any other real world or virtual world mapping information utilized by an application 147 on the electronic device 101. According to an embodiment of the present disclosure, the memory 130 stores software and/or a program 140. The program 140 includes, e.g., a kernel 141, middleware 143, an application programming interface (API) 145, and/or an application program (or "application") 147. At least a portion of the kernel 141, middleware 143, or API 145 can be denoted an operating system (OS).

For example, the kernel 141 can control or manage system resources (e.g., the bus 110, processor 120, or a memory 130) used to perform operations or functions implemented in other programs (e.g., the middleware 143, API 145, or application program 147). The kernel 141 provides an interface that allows the middleware 143, the API 145, or the application 147 to access the individual components of the electronic device 101 to control or manage the system resources.

The middleware 143 can function as a relay to allow the API 145 or the application 147 to communicate data with the kernel 141, for example. A plurality of applications 147 can be provided. The middleware 143 is able to control work requests received from the applications 147, e.g., by allocating the priority of using the system resources of the electronic device 101 (e.g., the bus 110, the processor 120, or the memory 130) to at least one of the plurality of applications 147.

The API 145 is an interface allowing the application 147 to control functions provided from the kernel 141 or the middleware 143. For example, the API 145 includes at least one interface or function (e.g., a command) for filing control, window control, image processing, or text control.

The IO interface 150 serve as an interface that can, e.g., transfer commands or data input from a user or other external devices to other component(s) of the electronic device 101. Further, the IO interface 150 can output commands or data received from other component(s) of the electronic device 101 to the user or the other external device.

The display 160 includes, e.g., a liquid crystal display (LCD), a light emitting diode (LED) display, an organic light emitting diode (OLED) display, or a microelectromechanical systems (MEMS) display, or an electronic paper display. The display 160 is able to display, e.g., various contents (e.g., text, images, videos, icons, or symbols) to the user. The display 160 can include a touchscreen and may receive, e.g., a touch, gesture, proximity or hovering input using an electronic pen or a body portion of the user.

For example, the communication interface 170 is able to set up communication between the electronic device 101 and an external electronic device (e.g., a first electronic device 102, a second external electronic device 104, or a server 106). For example, the communication interface 170 can be connected with the network 162 or 164 through wireless or wired communication to communicate with the external electronic device. The communication interface 170 can be a wired or wireless transceiver or any other component for transmitting and receiving signals, such as video feeds or video streams.

Electronic device 101 further includes one or more sensors 180 that can meter a physical quantity or detect an activation state of the electronic device 101 and convert metered or detected information into an electrical signal. For example, sensor 180 can include one or more buttons for touch input, a camera, a gesture sensor, a gyroscope or gyro sensor, an air pressure sensor, a magnetic sensor or magnetometer, an acceleration sensor or accelerometer, a depth or distance sensor, a grip sensor, a proximity sensor, a color sensor (e.g., a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an IR sensor, an ultrasound sensor, an iris sensor, a fingerprint sensor, etc. The sensor(s) 180 can further include a control circuit for controlling at least one of the sensors included therein. Any of these sensor(s) 180 can be located within the electronic device 101. In some embodiments, a camera sensor 180 can capture a plurality of frames for a single image to be combined by the processor 120. In some embodiments, the illumination sensor 180 can capture ambient light data to be processed by the processor 120 to determine whether the electronic device is in a folded or unfolded state. In some embodiments, sensor(s) 180 can include sensors that can detect movement or location of the hinge. The processor 120 can use the hinge position information to determine whether the electronic device is in a folded or unfolded state.

The wireless communication is able to use at least one of, e.g., long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include at least one of universal serial bus (USB), high definition multimedia interface (HDMI), recommended standard 232 (RS-232), or plain old telephone service (POTS).

The network 162 includes at least one of communication networks. Examples of communication include a computer network (e.g., local area network (LAN) or wide area network (WAN)), Internet, or a telephone network.

The first and second external electronic devices 102 and 104 and server 106 each can be a device of the same or a different type from the electronic device 101. According to certain embodiments of the present disclosure, the server 106 includes a group of one or more servers. According to certain embodiments of the present disclosure, all or some of operations executed on the electronic device 101 can be executed on another or multiple other electronic devices (e.g., the electronic devices 102 and 104 or server 106). According to certain embodiments of the present disclosure, when the electronic device 101 should perform some function or service automatically or at a request, the electronic device 101, instead of executing the function or service on its own or additionally, can request another device (e.g., electronic devices 102 and 104 or server 106) to perform at least some functions associated therewith. The other electronic device (e.g., electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique can be used, for example.

Although FIG. 1 shows that the electronic device 101 includes the communication interface 170 to communicate with the external electronic device 104 or server 106 via the network 162, the electronic device 101 can be independently operated without a separate communication function, according to an embodiment of the present disclosure.

The server 106 can support to drive the electronic device 101 by performing at least one of operations (or functions) implemented on the electronic device 101. For example, the server 106 can include a processing module or processor that may support the processor 120 implemented in the electronic device 101.

For example, the electronic device 101 can include an event processing module, such as within processor 120. The event processing module can process at least part of information obtained from other elements (e.g., the processor 120, the memory 130, the input/output interface 150, or the communication interface 170) and can provide the same to the user in various manners. The server event processing module can include at least one of the components of the event processing module and perform (or instead perform) at least one of the operations (or functions) conducted by the event processing module.

The event processing module can be separate from the processor 120 or at least a portion of the event processing module can be included or implemented in the processor 120 or at least one other module, or the overall function of the event processing module can be included or implemented in the processor 120 shown or another processor. The event processing module can perform operations according to embodiments of the present disclosure in interoperation with at least one program 140 stored in the memory 130.

Figure 2:
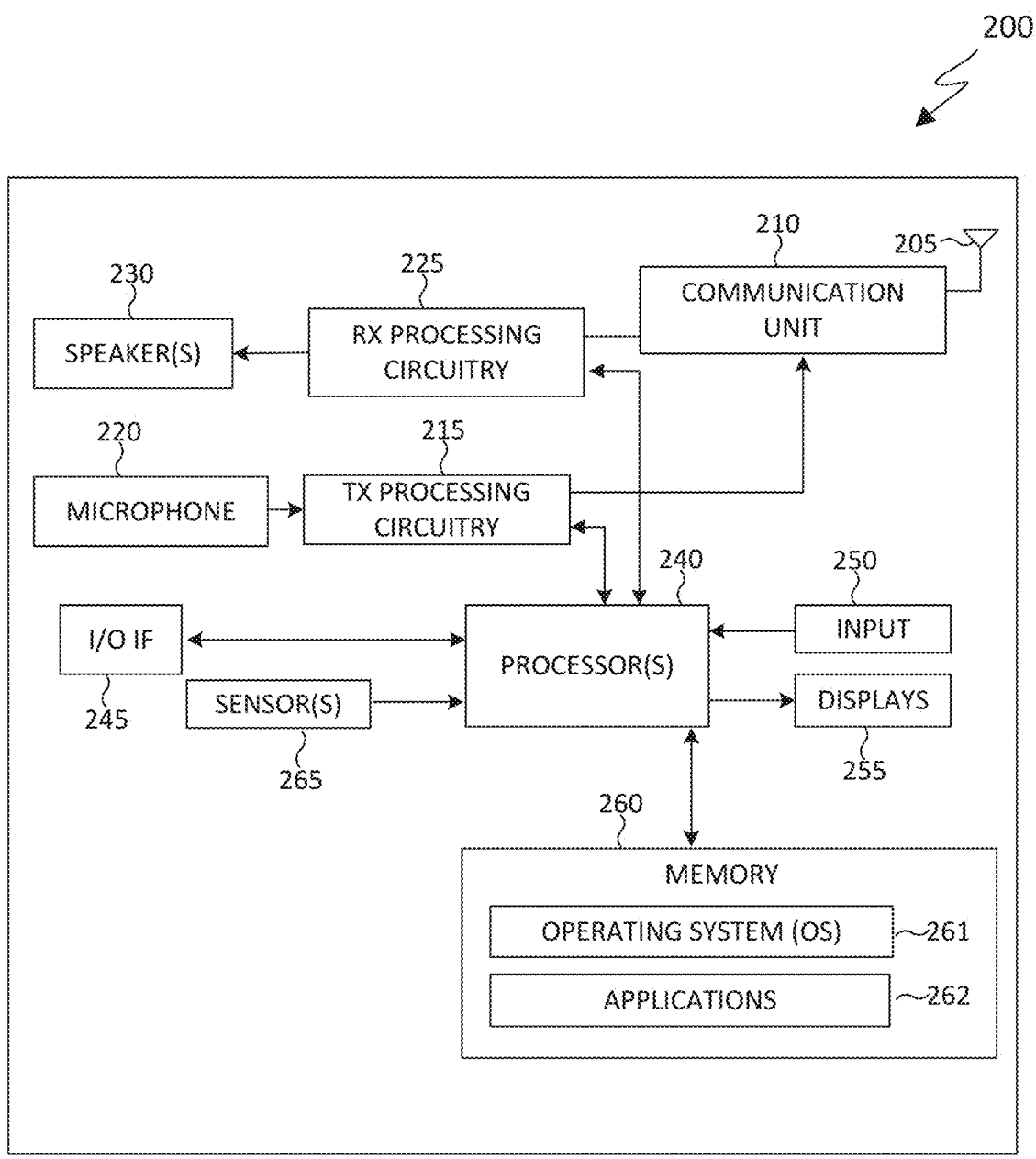
FIG. 2 illustrates an example electronic device according to an embodiment of this disclosure.

FIG. 2 illustrates an example electronic device 200 according to an embodiment of this disclosure. In some embodiments, the electronic device 200 is useable with data transfer applications, such providing and receiving information from a server. The electronic device can be a TV (such as SAMSUNG SMART TV®). The electronic device 200 can be a digital video disc (DVD) player, a TV box (such as SAMSUNG HOMESYNC, APPLETV, or GOOGLE TV), a gaming console (such as an XBOX, PLAYSTATION, or NINTENDO), or any of the other types of electronic devices described above. The electronic device 200 can be a mobile communication device, such as, for example, a mobile station, a subscriber station, a wireless terminal, a desktop computer, a portable electronic device, and the like. The electronic device 200 can be a foldable electronic device that includes a foldable display.

As shown in FIG. 2, the electronic device 200 includes an antenna 205, a communication unit 210, transmit (TX) processing circuitry 215, a microphone 220, and receive (RX) processing circuitry 225. The communication unit 210 can include, for example, a radio frequency (RF) transceiver, a BLUETOOTH transceiver, a WI-FI transceiver, a ZIGBEE transceiver, an infrared transceiver, and the like. The electronic device 200 also includes a speaker 230, a processor 240, an input/output (I/O) interface (IF) 245, an input 250, a display 255, a memory 260, and a sensor(s) 265. The memory 260 includes an operating system (OS) 261 and one or more applications 262.

The communication unit 210 receives, from the antenna 205, an incoming RF signal transmitted from an access point (such as a base station, WI-FI router, or Bluetooth device) or other device of a network (such as a WI-FI, Bluetooth, cellular, 5G, LTE, LTE-A, WiMAX, or any other type of wireless network). The communication unit 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The communication unit 210 receives the outgoing processed baseband or intermediate frequency signal from the TX processing circuitry 215 and up-converts the baseband or intermediate frequency signal to an RF signal that is transmitted via the antenna 205.

The processor 240 can include one or more processors or other processing devices. The processor 240 can execute instructions that are stored in a memory 260, such as the OS 261, in order to control the overall operation of the electronic device 200. For example, the processor 240 could control the reception of forward channel signals and the transmission of reverse channel signals by the communication unit 210, the RX processing circuitry 225, and the TX processing circuitry 215 in accordance with well-known principles. The processor 240 can include any suitable number(s) and type(s) of processors or other devices in any suitable arrangement. For example, in some embodiments, the processor 240 includes at least one microprocessor or microcontroller. Example types of processor 240 include microprocessors, microcontrollers, digital signal processors, field programmable gate arrays, application specific integrated circuits, and discreet circuitry The processor 240 is also capable of executing other processes and programs resident in the memory 260, such as operations that receive, store, and timely instruct by providing an input into a neural network. The processor 240 can move data into or out of the memory 260 as required by an executing process. In some embodiments, the processor 240 is configured to execute a plurality of applications 262 based on the OS 261 or in response to signals received from external source(s) or an operator. Example applications 262 can include a camera application (for still images and videos), a video phone call application, an email client, a social media client, an SMS messaging client, a virtual assistant, and the like. The processor 240 is also coupled to the I/O interface 245 that provides the electronic device 200 with the ability to connect to other devices. The I/O interface 245 is the communication path between these accessories and the processor 240.

The processor 240 is also coupled to the input 250 and the displays 255. The operator of the electronic device 200 can use the input 250 to enter data or inputs into the electronic device 200. Input 250 can be a keyboard, touch screen, mouse, track ball, voice input, or other device capable of acting as a user interface to allow a user in interact with electronic device 200. For example, the input 250 can include voice recognition processing, thereby allowing a user to input a voice command. As another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. Input 250 can be associated with sensor(s) 265 and/or a camera by providing additional input to processor 240. In some embodiments, the sensor 265 includes one or more inertial measurement units (IMUs) (such as accelerometers, gyroscope, and magnetometer), motion sensors, optical sensors, cameras, pressure sensors, heart rate sensors, altimeter, and the like. The input 250 can also include a control circuit. In the capacitive scheme, the input 250 can recognize touch or proximity. The processor 240 is able to receive the input 250 selection of an application and determine how to display the user interface of the application on the displays 255 of the electronic device 200. The processor 240 can also determine how to display multiple user interfaces of multiple applications on the displays 255 of the electronic device 200. The processor 240 can receive input to rearrange and manipulate the display of the user interfaces of the applications and respond. The processor 240 responds to the input by rearranging and reformatting the display of the user interfaces of the applications on the displays 255 of the electronic device 200.

The electronic device includes one or more displays 255 that can be a liquid crystal display (LCD), light-emitting diode (LED) display, organic LED (OLED), active matrix OLED (AMOLED), or other display capable of rendering text and/or graphics, such as from websites, videos, games, images, and the like. At least one display 255 is a foldable display that is capable of enfolding into a closed state. The foldable display can have two portions, a first portion and a second portion, such that the foldable display is in a folded or closed state when the first portion and the second portion face each other or face in opposite directions. The foldable display is in an unfolded or open state, when the first portion and the second portion form a substantially planar surface. The foldable display is capable of presenting for display one or more user interfaces of applications as executed by the processor 240.

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 265 that can meter a physical quantity or detect an activation state of the electronic device 200 and convert metered or detected information into an electrical signal. The sensors 265 can detect when the electronic device is going from an open, or unfolded, state to a closed, or folded, state. For example, the sensor 265 can include one or more buttons for a touch input, a camera, a gesture sensor, an IMU sensors (such as a gyroscope or gyro sensor and an accelerometer), an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an infrared (IR) sensor, an ultrasound sensor, an iris sensor, a fingerprint sensor, and the like. The sensors 265 can include a location sensor, such as a Global Positioning Sensor (GPS). The sensors 265 can further include control circuits for controlling any of the sensors included therein. Any of these sensor(s) 165 can be located within the electronic device 200.

Although FIG. 2 illustrates examples of electronic devices, various changes can be made to FIG. 2. For example, various components in FIG. 2 could be combined, further subdivided, or omitted and additional components could be added according to particular needs. As a particular example, the processor 240 could be divided into multiple processors, such as one or more central processing units (CPUs) and one or more graphics processing units (GPUs). In addition, electronic devices can come in a wide variety of configurations, and FIG. 2 does not limit this disclosure to any particular electronic device.

Figure 3A:
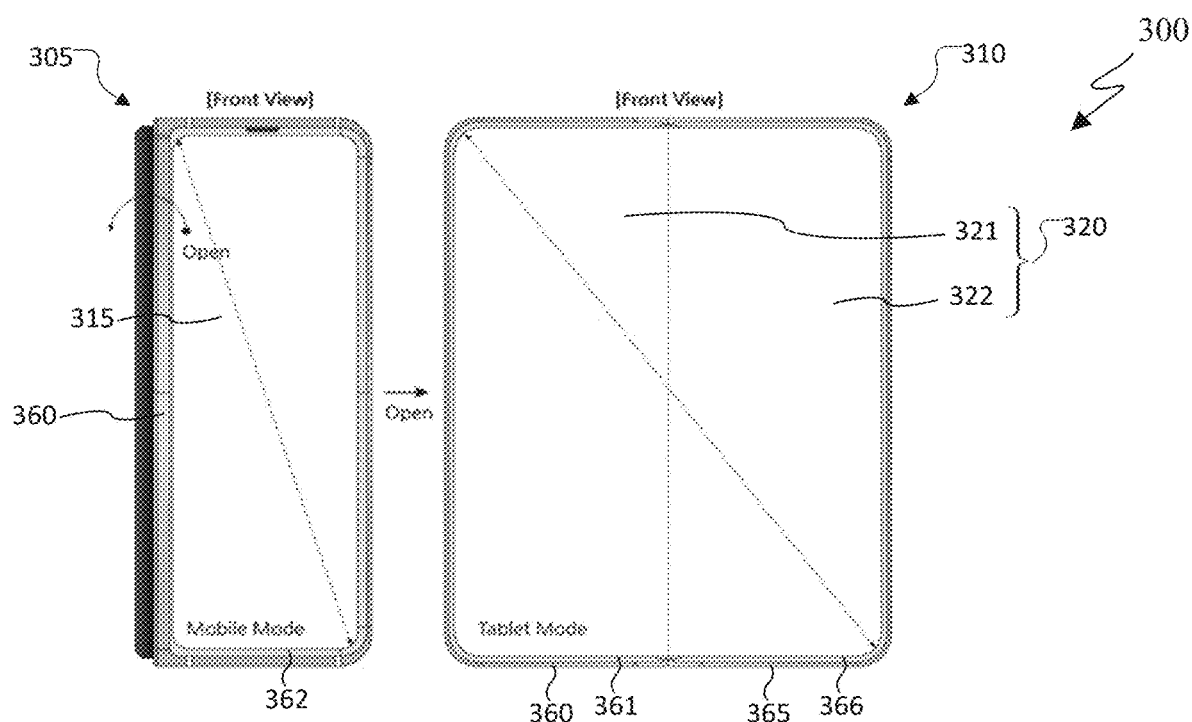
FIGS. 3A and 3B illustrate examples of a front view of a foldable electronic device with a foldable display according to embodiments of this disclosure.
Figure 3B:
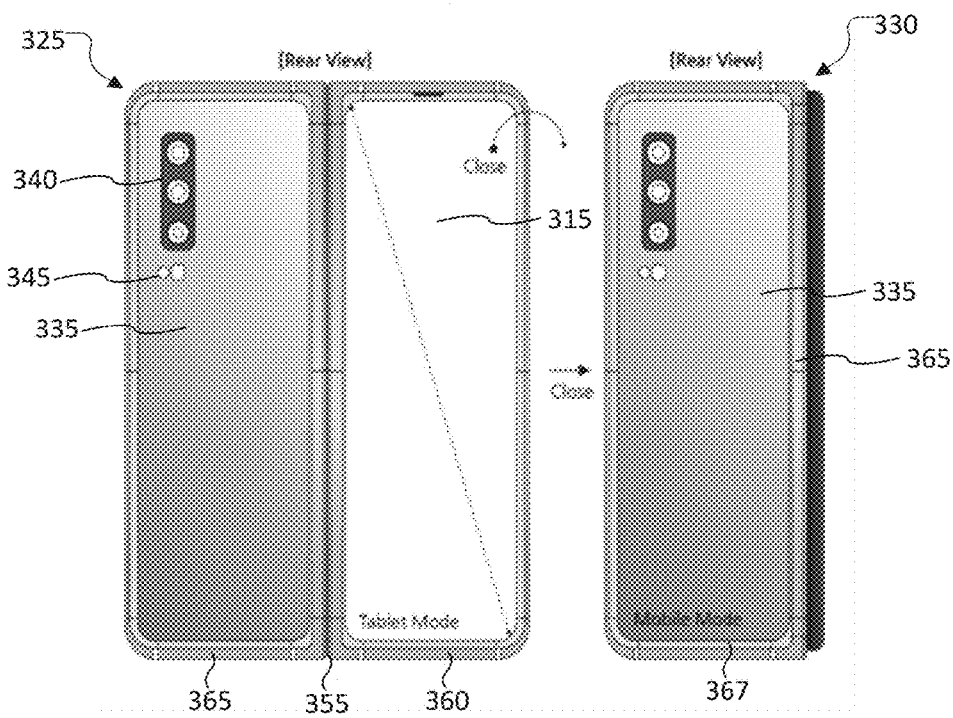

FIGS. 3A and 3B illustrate examples of a front view and back view of a foldable electronic device 300 with a foldable display according to embodiments of this disclosure. The embodiment of the foldable electronic device 300 with a foldable display as shown in FIGS. 3A and 3B are for illustration only and other embodiments could be used without departing from the scope of the present disclosure. According to embodiments of this disclosure a foldable electronic device 300 is the same as the electronic device 200 and the foldable electronic device 300 is understood to be a mobile phone. According to embodiments of this disclosure, the terms foldable electronic device and electronic device are used interchangeably when referring to the systems and methods for displaying applications on a foldable display.

Referring to non-limiting examples of FIGS. 3A and 3B, a foldable electronic device 300 comprises a foldable housing 350 including a hinge structure 355, a first housing structure 360 and a second housing structure 365. According to embodiments of this disclosure, the first housing structure 360 and the second housing structure 365 are coupled to the hinge structure 355 such that the second housing structure 365 is foldable and unfoldable with respect to the first housing structure 360 about the hinge structure 355. The foldable electronic device 300 is an outfolding type of foldable device such that the first housing structure 360 and the second housing structure 365 can rotate up to 360° about the hinge structure 355. The first housing structure includes a first surface 361 and a second surface 362 which faces away from the first surface 361. The second housing structure 365 includes a third surface 366 and a fourth surface 367 which faces away from the third surface 366. When the foldable housing 350 is in a folded state, or closed, the first surface 361 faces the third surface 366 so as to not be exposed to the outside. The second housing structure 365 is folded onto the first housing structure 360 in the folded state. According to embodiments of this disclosure, the foldable housing 350 can also be in a folded state, or closed, when the fourth surface 367 faces the second surface 362 so as to not be exposed to the outside.

The foldable housing 350 is in an unfolded state, or open when the first surface 361 and third surface 366 no longer substantially face each other so as to not be exposed to the outside and the first surface 361 and third surface 366 generally face in the same direction, forming a planar surface. The second housing structure 365 forms a substantially planar surface with the first housing structure 360 in the unfolded state. According to embodiments of this disclosure, the second surface 362 and the fourth surface 367 also generally face in the same direction, forming a planar surface in an unfolded state. A foldable display 320 is positioned on the foldable housing 350 on the first surface 361 and the third surface 366. According to embodiments of this disclosure, the foldable display 320 can be positioned in the foldable housing 350 such that the foldable display 320 is facing externally when either the first housing structure 360 or the second housing structure 365 folds open 360° about the hinge 355.

According to embodiments of this disclosure a foldable display 320 includes a first portion 321 and a second portion 322. The first portion 321 is positioned in the first housing structure 360 and the second portion 322 is positioned in the second housing structure 365. The first portion of the display 321 and the second portion of the display 322 form a portion of the first surface 361 and the third surface 366.

According to embodiments of this disclosure, a non-foldable display 315 is positioned in the first housing structure 360 on the second surface 362.

Referring to the non-limiting example of FIG. 3A a front folded view 305 of the foldable electronic device 300 comprises a non-foldable display 315 disposed to face an exterior when the foldable electronic device 300 is in a folded or closed state. According to embodiments of this disclosure the non-foldable display 315 can also face an interior when the foldable electronic device 300 is in a closed or folded state, such that the foldable display 320 is disposed to face the exterior. According to embodiments of this disclosure, when the foldable electronic device 300 is in a folded state it may also be referred to as being in mobile mode or closed. The non-foldable display 315 is disposed on the second surface 362. The non-foldable display 315 is not limited to positioning on the first housing structure 360, and second surface 362, but could also be positioned in the second housing structure 365 on the fourth surface 367.

FIG. 3A illustrates that when the foldable electronic device 300 is opened a foldable display 320, which encompasses the full width and height of the foldable electronic device 300 when unfolded, is visible. The foldable display 320 comprises the first portion 321 and the second portion 322. The first portion 321 is disposed on the first surface 361 and the second portion 322 is disposed on the third surface 366. According to embodiments of this disclosure, when the foldable electronic device 300 is in an unfolded state it may be referred to as being in tablet mode or open. In certain embodiments, a viewable size of the non-foldable display 315 is different than a viewable size of the foldable display 320. In certain embodiments, an aspect ratio, namely a ratio of a width to height of the screen, of the non-foldable display 315 is different than an aspect ratio of the foldable display 320.

Referring to the non-limiting example of FIG. 3B a rear unfolded view 325 of the foldable electronic device 300 comprises the non-foldable display 315 and an exterior rear surface 335 disposed beside the non-foldable display 315 and facing the same direction. The exterior rear surface 335 is disposed on the fourth surface 367. The exterior rear surface 335 may include cameras 340 and other sensors 345. A rear folded view 330 of the foldable electronic device 300 comprises the exterior rear surface 335 which is disposed to face in the opposite direction of the non-foldable display 315.

Applications for mobile devices, as written by developers, may contain screen size restrictions. The screen size restrictions may limit the ability for a mobile device to download a particular application. Screen size restrictions also present problems when a mobile device has multiple screens. There exists no good solution, or user interface, to display applications on a mobile device with multiple display sizes.

FIG. 4 illustrates an example for how applications can restrict the display sizes that are supported in a manifest file according to embodiments of this disclosure. The example manifest file as shown in FIG. 4 is for illustration only and other embodiments could be used without departing from the scope of the present disclosure.

Referring to the non-limiting example of FIG. 4, a developer of an application can restrict the screen size of a user interface of an application to fit one or more of a small screen, a normal screen, a large screen, or an extra large screen in a manifest file of the application. Downloading an application to an electronic device 300 may be prevented if the electronic device 300 does not have the adequate screen size or aspect ratio for display of the application. A small screen or normal screen layout would correspond with the foldable electronic device 300 displaying in mobile mode using the non-foldable display 315. A large screen or extra large screen layout would correspond to the foldable electronic device 300 displaying in tablet mode using the foldable display 320. According to embodiments of this disclosure, the foldable electronic device 300 is not restricted by screen size configurations when downloading an application because it is configured to display all user interface screen size configurations.

Figure 5:
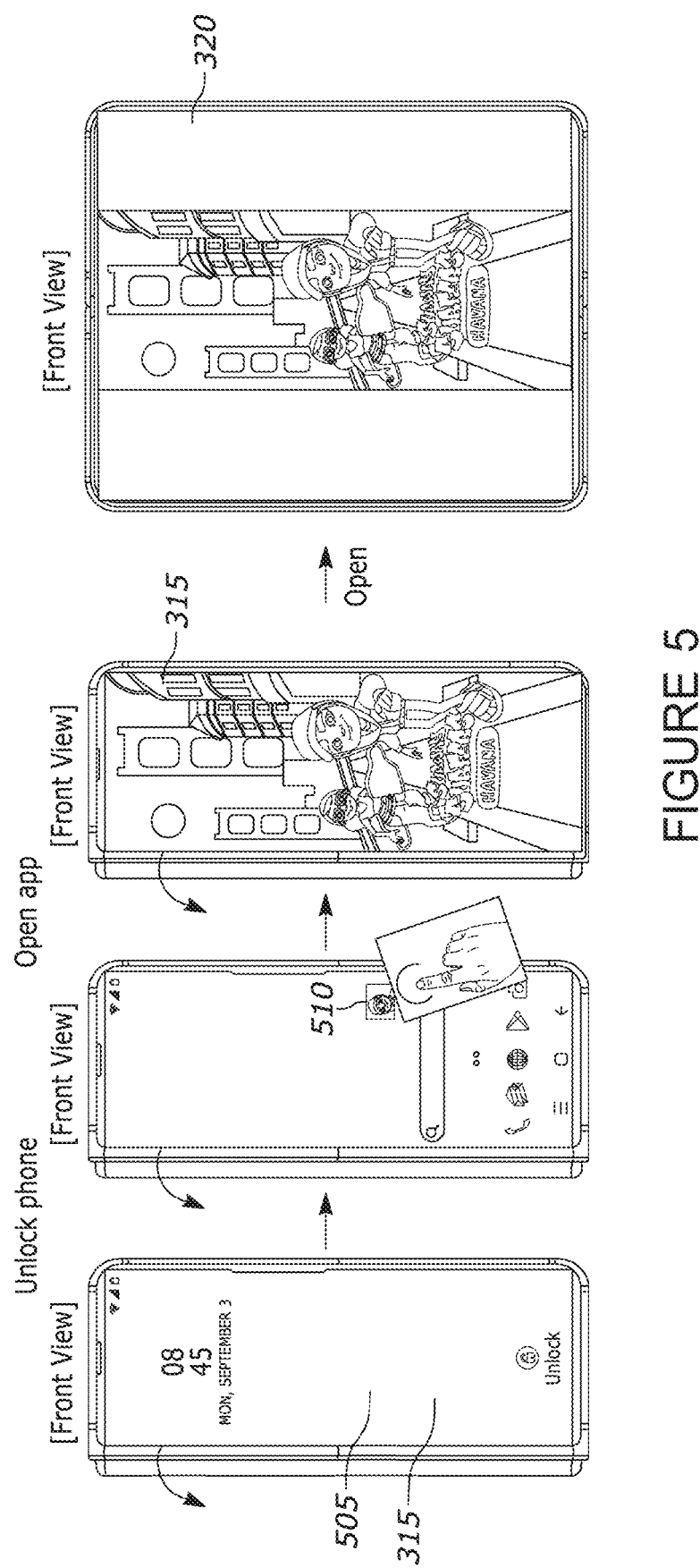
FIG. 5 illustrates an example of a feature flaw when a user interface of an application which is sized for a particular screen size or aspect ratio maintains that size or aspect ratio when a foldable electronic device is opened according to embodiments of this disclosure.

FIG. 5 illustrates an example of a feature flaw when a user interface of an application that is sized for a particular screen size or aspect ratio maintains that size or aspect ratio when a foldable electronic device 300 is opened according to embodiments of this disclosure. The embodiment of the feature flaw as shown in FIG. 5 is for illustration only and other embodiments could be used without departing from the scope of the present disclosure.

In the example shown in FIG. 5, the non-foldable display 315 has a first aspect ratio and the foldable display 320 has a second aspect ratio that is different than the first aspect ratio. For example, the non-foldable display 315 and foldable display 320 may have a same or matching height while the non-foldable display 315 may have a smaller width. In some cases, the width of the non-foldable display 315 may be half the width of the foldable display 320. In certain embodiments, the non-foldable display 315 and foldable display 320 may have a same or matching width while the non-foldable display 315 may have a smaller height. In certain embodiments, the non-foldable display 315 and foldable display 320 may have dissimilar or non-matching heights and widths.

In the illustrated example, a lock screen 505 is displayed on the non-foldable display 315. After a user unlocks the phone, the user can select an icon 510 of an application program (for example, a game app) displayed on the non-foldable display 315, thereby displaying a user interface of the application program on the non-foldable display 315.

After the user interface is displayed on the non-foldable display 315, the user can open the foldable electronic device 300 for use in the unfolded state or tablet mode. If the user interface of the application program has a screen size restriction, the user interface will be displayed, for example, in the center of the foldable display, 320 with remaining portion of the display rendered black. That is, the developer limited the screen size in the manifest file to display only on a small screen. When the user interface of the application is presented on the larger screen size of the foldable display, the size does not vary and the user interface will be positioned in the center of the foldable display. As illustrated, much of the interior display real estate is left unutilized According to embodiments of the present disclosure, a foldable electronic device 300 has the capability to download and install any application for use on the foldable electronic device 300 regardless of user interface screen size restrictions. For example, a foldable electronic device 300 can display the user interface of the installed application in the corresponding size, using either the entire or partial display area of the foldable display 320. The size and how the application is displayed on the foldable display 320 is based on the application user interface size restrictions. In this manner, the electronic device 300 can control the placement and sizes of user interfaces of the applications displayed on the foldable display 320 to best utilize the full real estate of the foldable display 320.

Figure 6:
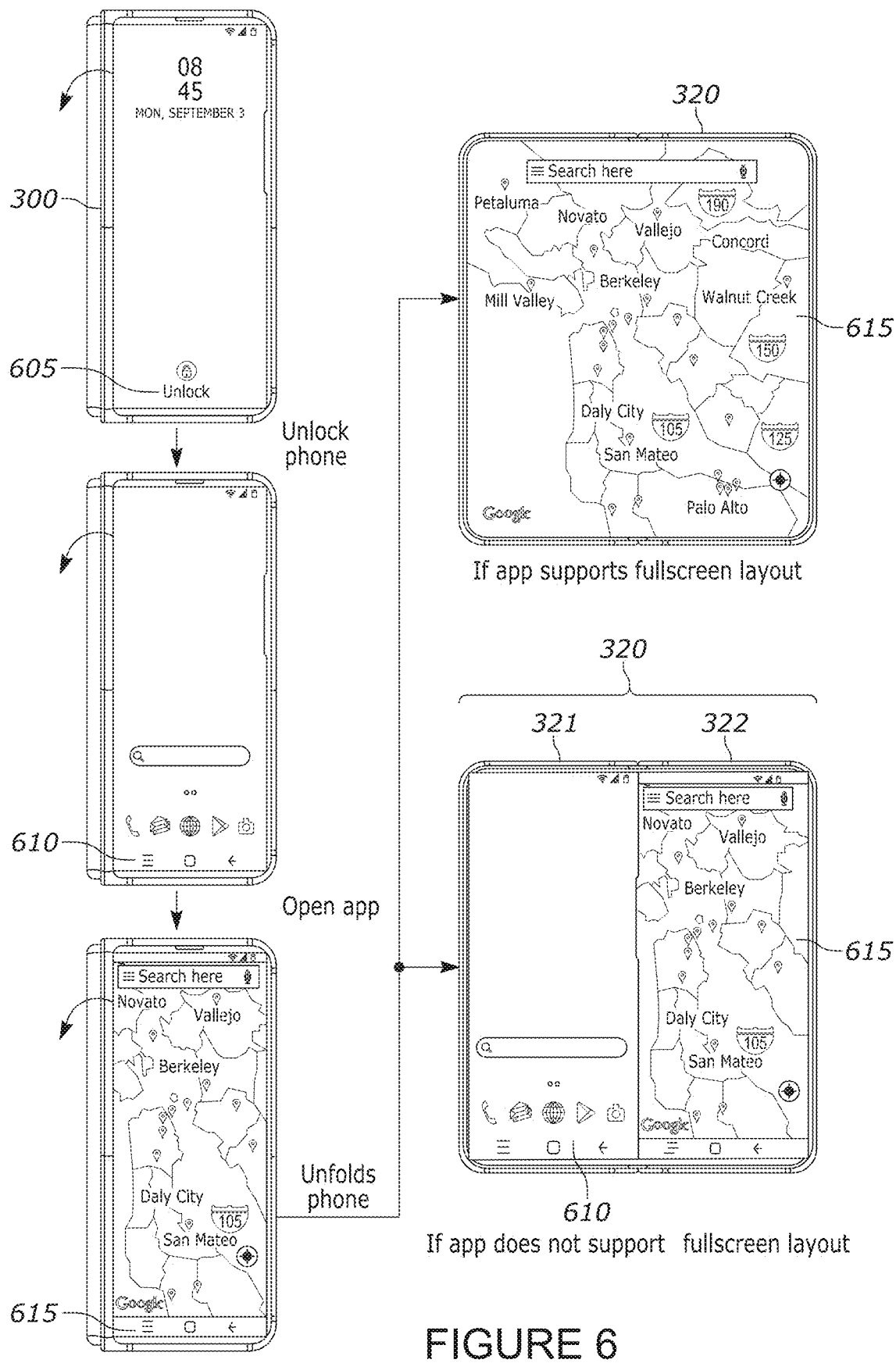
FIG. 6 illustrates an example display of an application's user interface on the non-foldable display and based on size restrictions, the user interface of the application may be displayed on the entire or partial portion of the foldable display according to embodiments of this disclosure.

FIG. 6 illustrates an example display of an application's user interface on the non-foldable display 315 and based on size restrictions, the user interface of the application may be displayed on the entire or partial portion of the foldable display 320 according to embodiments of this disclosure. The embodiment of how user interfaces of applications are displayed as shown in FIG. 6 is for illustration only and other embodiments could be used without departing from the scope of the present disclosure.

Referring to the non-limiting example of FIG. 6, a lock screen 605 is displayed on an exterior, non-foldable display 315. A user unlocks the phone and a home launcher, or home screen, 610 is displayed on the non-foldable display 320. A user selects an application from the home screen 610 and the application 615 is displayed on the non-foldable display 615. The home screen 610 displays a plurality of application icons associated with various application programs available to be executed on the electronic device 300.

If the application is written such that it supports a full screen layout, the user interface of the application 615 will adjust to encompass the full foldable display 320. That is, the first portion 321 and the second portion 322 of the foldable display will display the user interface of the application 615.

If the application 615 is written such that it does not support a full screen, or large, layout, the electronic device 300 is configured to display the home screen 610 on the first portion 321 of the foldable display 320 and the user interface of the application 615 on the second portion 322 of the foldable display 320. In this manner, the full real estate of the foldable screen may be utilized when the application is not written to support the full screen size. According to embodiments of this disclosure, the positions of the home screen and the user interface of the application are not limited to the configuration provided and various changes may be made regarding how the user interface of the application and home screen are displayed.

FIGS. 7A, 7B, 7C, 7D and 7E illustrate examples of how user interfaces of applications are displayed based on contextual information according to embodiments of this disclosure. The embodiments of how the user interfaces of applications are displayed based on contextual information as shown in FIGS. 7A, 7B, 7C, 7D and 7E are for illustration purposes only and other embodiments could be used without departing from the scope of the present disclosure. In certain embodiments, the contextual information can be represented using at least one context parameter. The at least one context parameters can be associated with a least one of a time, a location, information on the first application program user, a user history, a user information, a user's purchase information, or a user's calendar information. The embodiments described in connection with FIGS. 7A, 7B, 7C, 7D and 7E can be implemented independently of the embodiments described above in connection with FIG. 6.

According to embodiments of this disclosure, a user input of a selection of an application program is received and in response a first user interface of the application program is displayed while the device is in the folded state on the non-foldable display 315. The electronic device 300 is configured to detect a change from the folded state to the unfolded state. A second user interface of the application program is selected based at least partly of at least one context parameter determined by the electronic device 300. The second user interface and the first user interface are displayed together on at least a portion of the foldable display 320 in the unfolded state. According to embodiments of this disclosure the first and second user interface are of the same application program, but display different information based on the detected context. The display of multiple user interfaces is not limited to display of the same application, but the electronic device 300 can also be configured to display multiple user interfaces of multiple application programs based on the detected context.

Referring to the non-limiting examples of FIGS. 7A, 7B, 7C, 7D and 7E, the electronic device 300 is configured to display a plurality of applications or user interfaces on a foldable display 320. According to embodiments, the electronic device 300 is configured to present one application in a larger portion of the foldable display 320 and another application in a smaller portion. The larger portion of the foldable display 320 can be further subdivided into sections to display multiple applications. Likewise, the smaller portion of the foldable display 320 can be further subdivided into sections to display multiple applications or user interfaces. Referring to the non-limiting example of FIG. 7A, a user has selected an application 705 (for example, a navigation or map application) which displays a map showing an airport. The user selection of the application can occur when the electronic device 300 is in the folded state. While the application 705 is being displayed on the non-foldable display 315, the electronic device 300 can detect a context of the electronic device and/or the application 705.

Figure 7A:
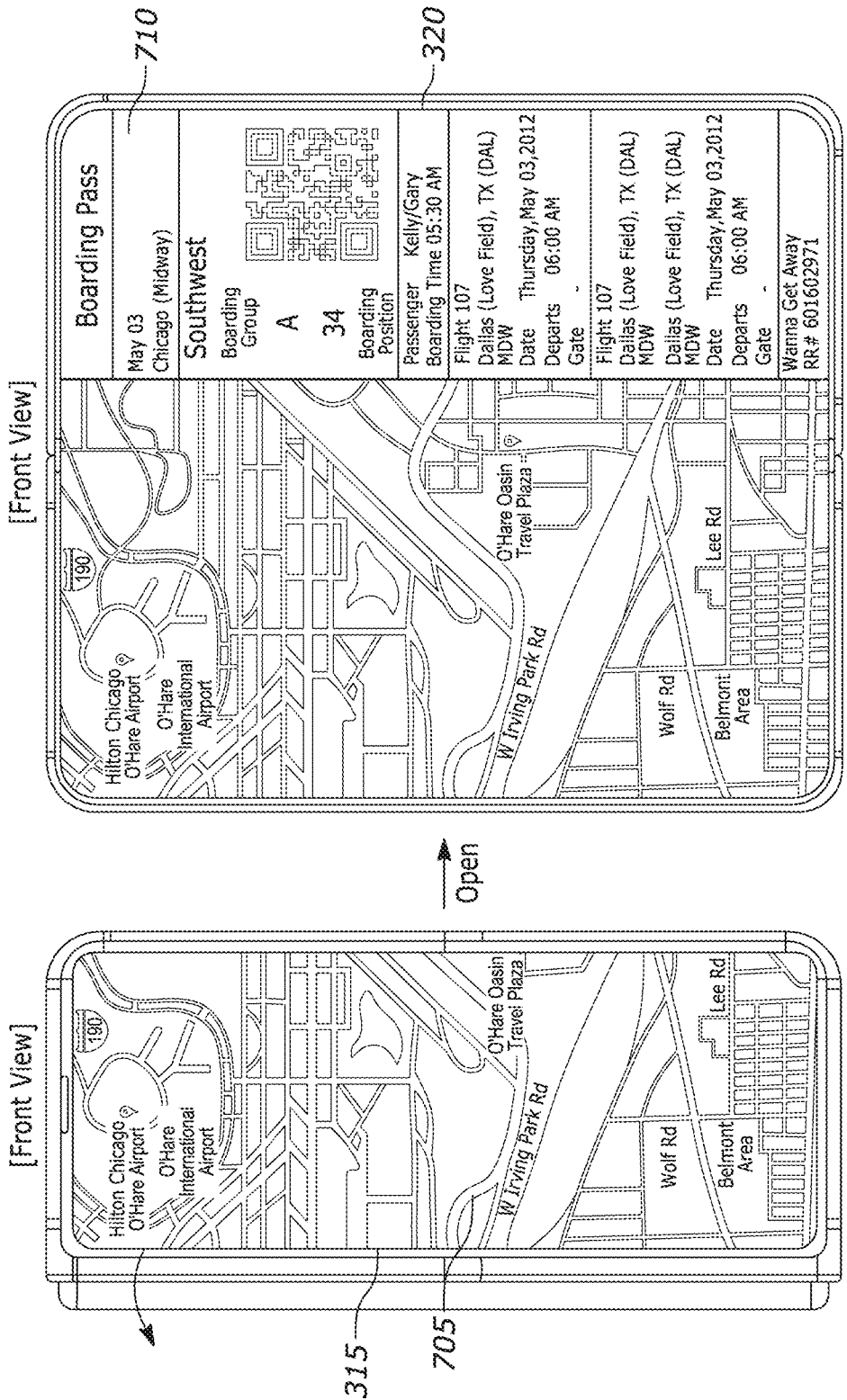
FIGS. 7A, 7B, 7C, 7D and 7E illustrate examples of how user interfaces of applications are displayed based on contextual information according to embodiments of this disclosure.

When the foldable electronic device 300 is opened to an unfolded state, the electronic device 300 can be configured to display a boarding pass 710 for the user in the smaller portion of the foldable display along with the user interface of the application 705 in the larger portion of the foldable display, as illustrated in FIG. 7A.

According to embodiments, when the user is at the airport the electronic device 300 can be configured to determine its location with its location sensor (such as sensor 180 from FIG. 1 or sensor 265 from FIG. 2). Thus, when the user opens the foldable device 300 to the unfolded state, the electronic device 300 may be triggered to display the boarding pass together with the user interface of the application program. The electronic device may be configured to use other methods of determining a location, including but not limited to information from beacons, known wireless networks, cellular tower triangulation, etc.

Figure 7B:
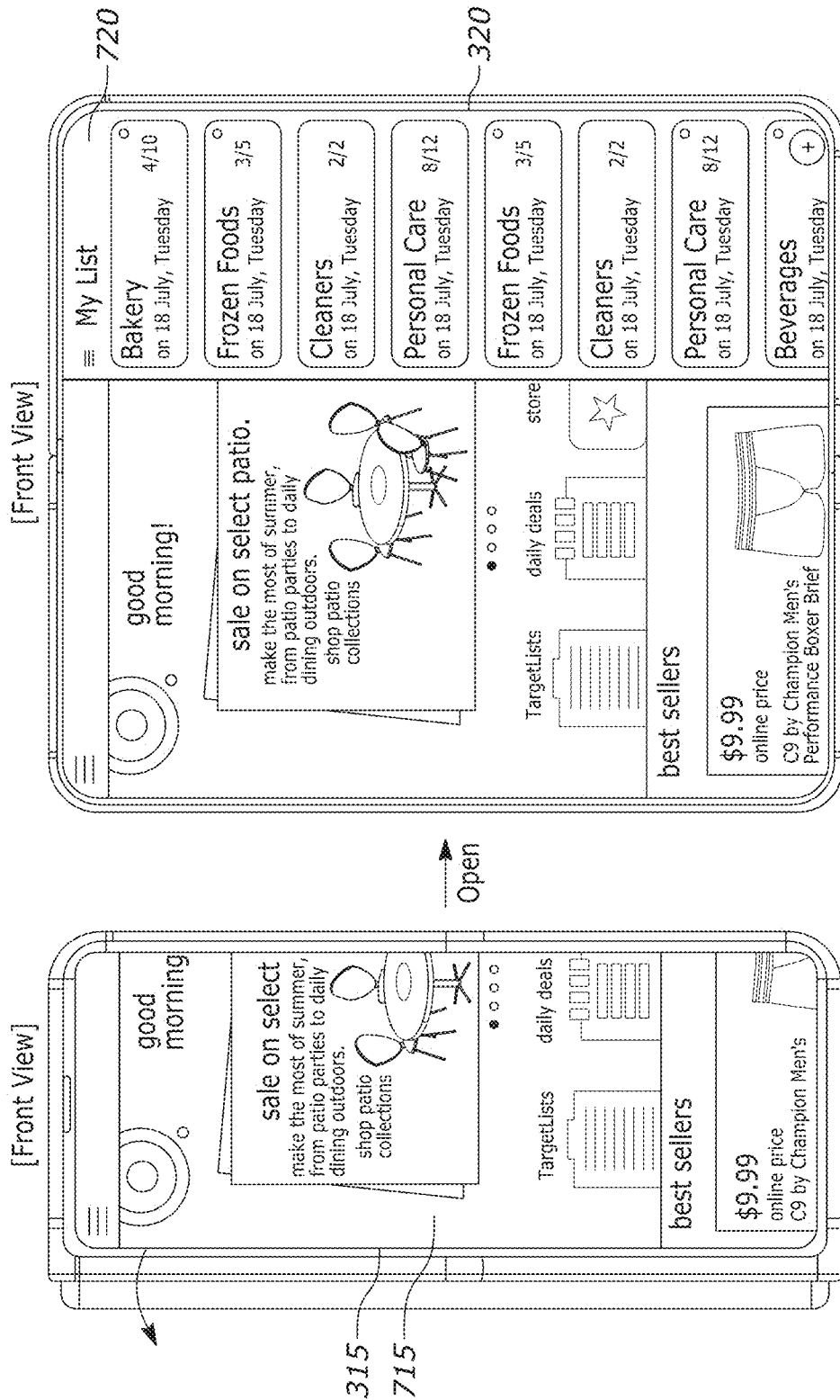

Referring to the non-limiting example of FIG. 7B, a user may be viewing an application 715 related to shopping on the non-foldable display 315. The electronic device 300 detects the context based on the shopping application 715. The electronic device 300 is configured to display a user's shopping list 720 along with the shopping application 715 when the electronic device 300 is opened to an unfolded state. According to embodiments, the electronic device 300 may be configured to display the user's shopping list 720 together with the shopping application 715 when the user enters the store associated with the shopping application 715. The electronic device 300 can determine if it is at the store with its location sensor (such as sensor 180 from FIG. 1 or sensor 265 from FIG. 2) and when the user opens the electronic device 300 to an unfolded state, the electronic device may be triggered to display the shopping list 720 in the smaller portion of the foldable display 320 with the shopping application 715 on the larger portion of the foldable display 320. According to embodiments of this disclosure the shopping list 720 may be one of the views of the shopping application 715 user interface. That is, the electronic device 300 is configured to display a user interface showing one view of an application program along with the same user interface showing a second view of an application program at the same time on the foldable display 320.

Figure 7C:
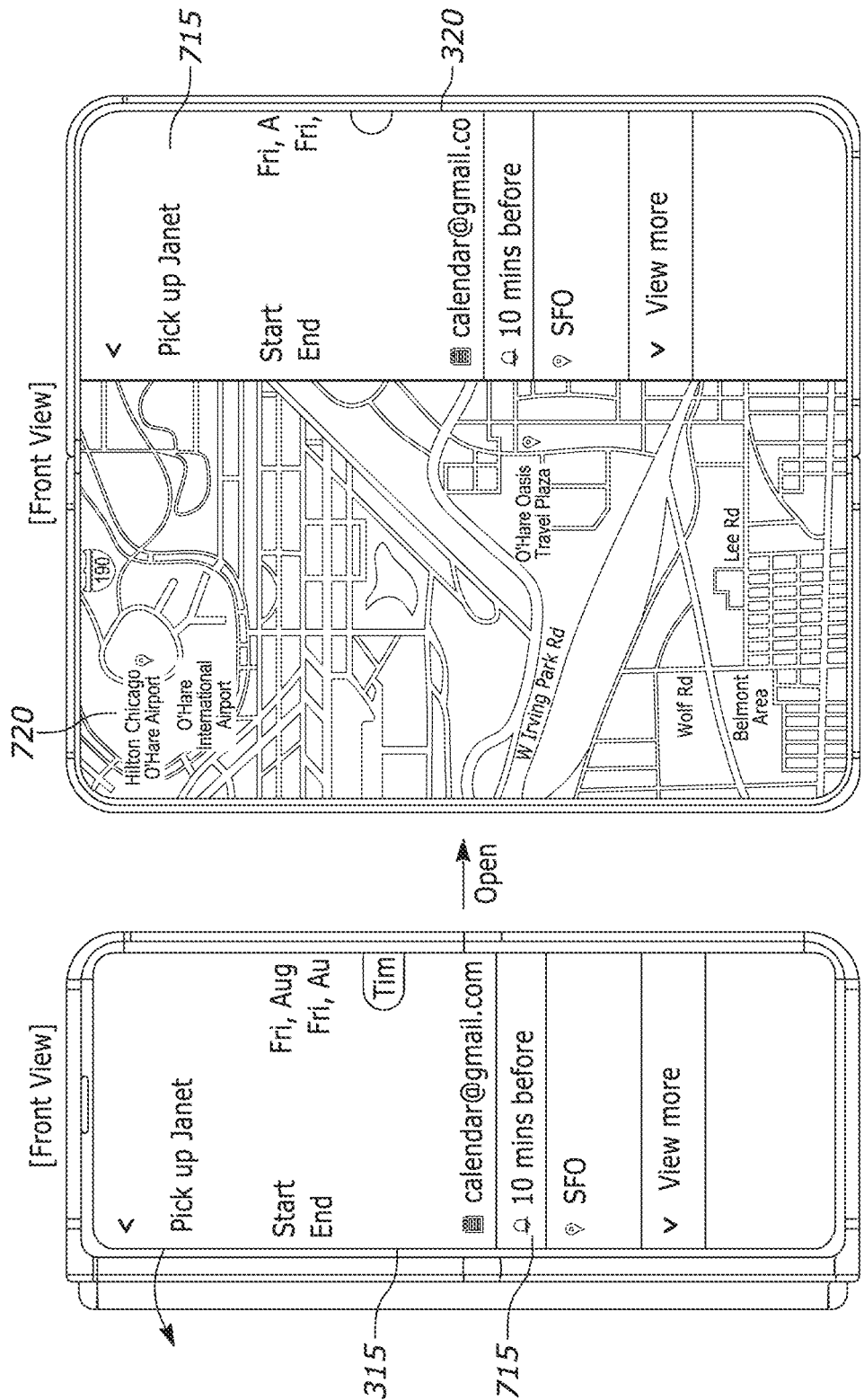

Referring to the non-limiting example of FIG. 7C, a user may be viewing a calendar event 725 on the non-foldable display. In this example, the calendar event 725 is related to picking someone up from the airport. The electronic device 300 detects the context based on the calendar event 725 and is configured display an application for directions 730 (for example, a navigation or map application) along with the calendar event 725 when the electronic device 300 is opened to an unfolded state. According to embodiments, the electronic device 300 can be configured to display the calendar event 725 in the smaller portion of the foldable display 320 together with the application 730 in the larger portion of the foldable display 320.

Figure 7D:
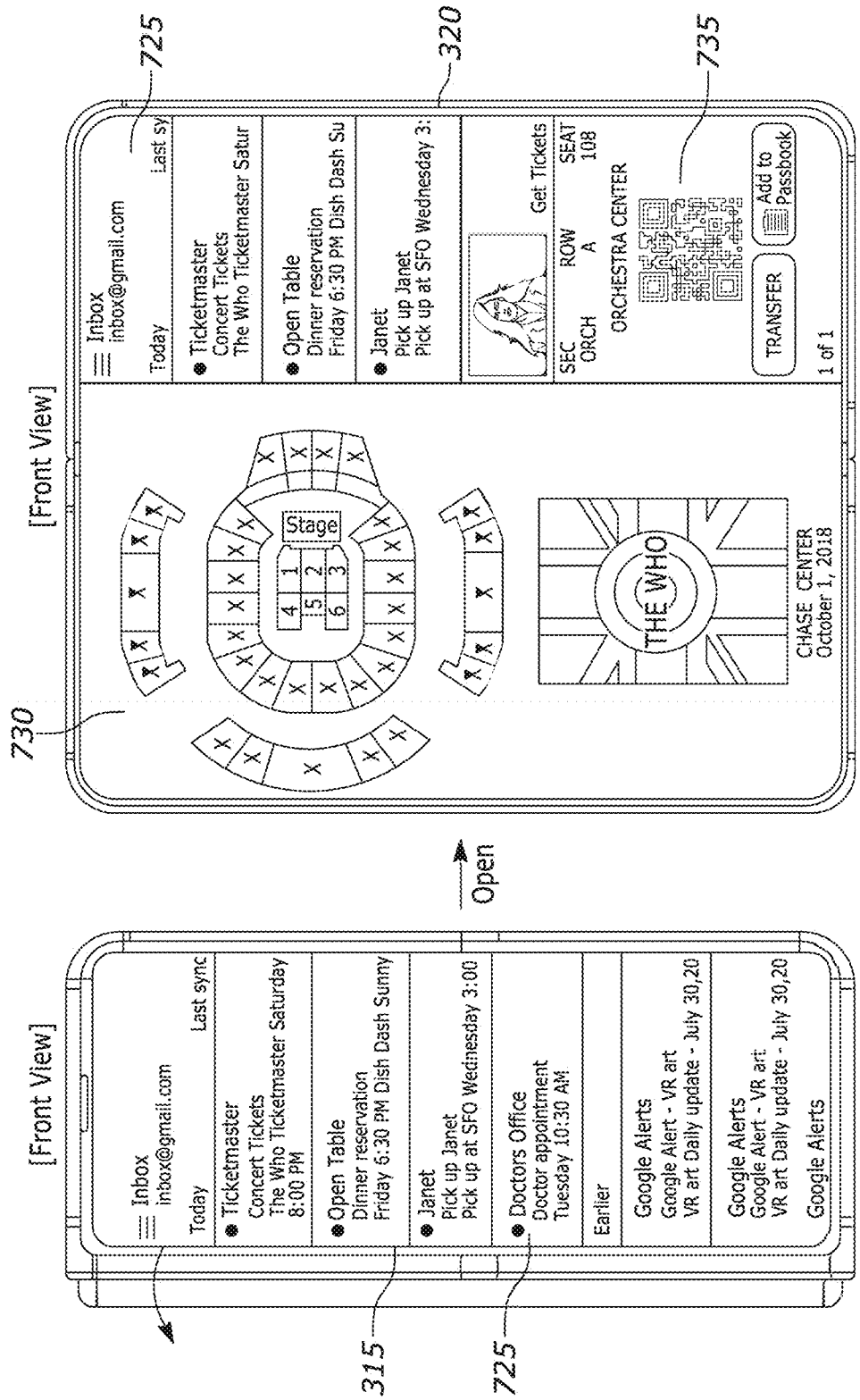

Referring to the non-limiting example of FIG. 7D, a user may be viewing an e-mail about concert tickets in an e-mail application 725 on the non-foldable display 315. The electronic device 300 can detect the context based on the email application 725 and is configured to display information about the concert venue 730 and the e-ticket 735 all on the foldable display when the electronic device 300 is opened to an unfolded state. In this example, the electronic device 300 is configured to display the information about the concert venue 730 in a larger portion of the foldable display 320 and the email application 725 and the e-ticket 735 are each displayed in split screens of the smaller portion of the foldable display 320.

Figure 7E:
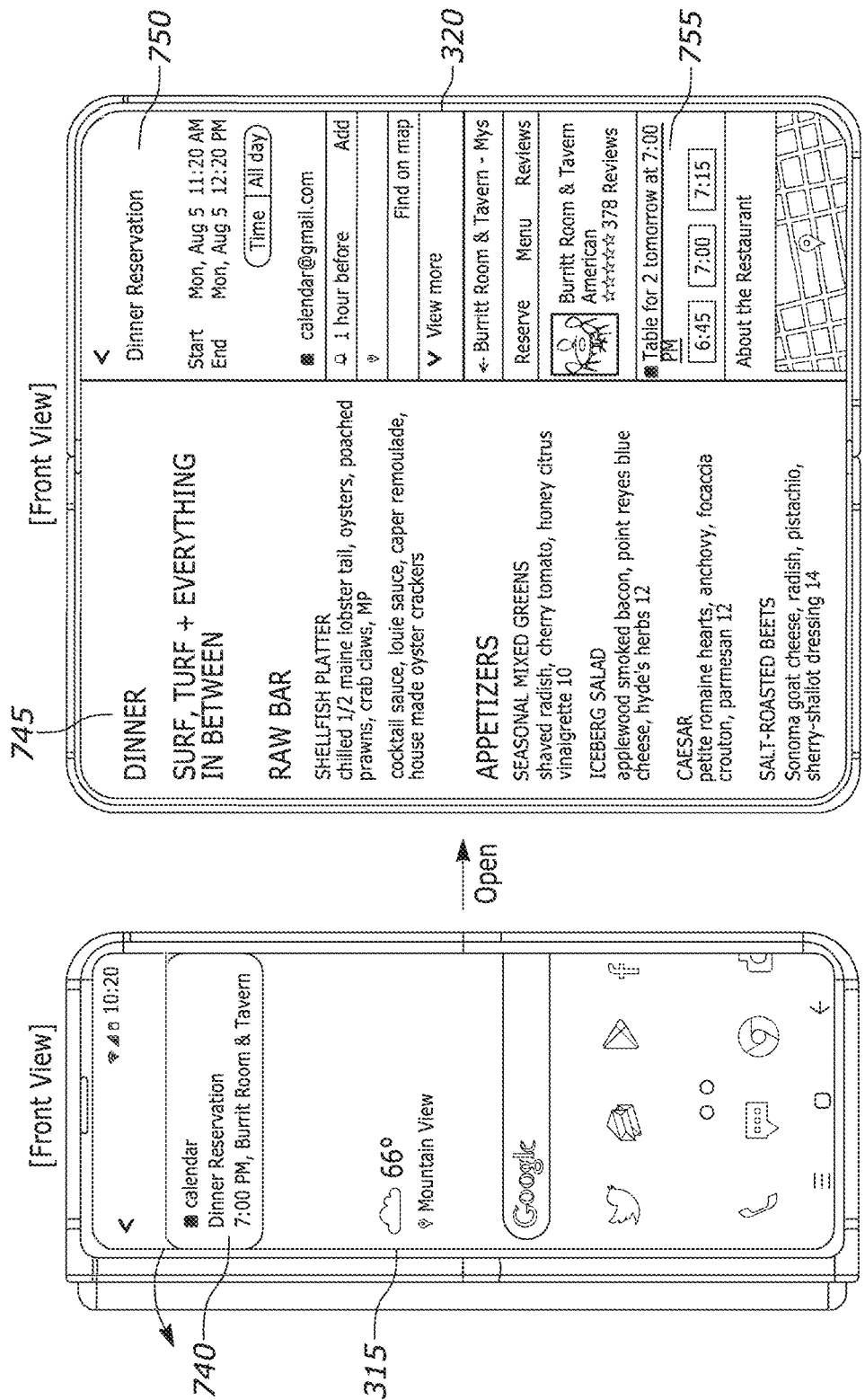

Referring to the non-limiting example of FIG. 7E, a user may receive a notification 740 of a calendar event 745 related to dinner reservations on the non-foldable display 315. The electronic device 300 can detect a context based on the notification 740 and the calendar event 745. When the user opens the electronic device 300 to an unfolded state, a restaurant menu 745 is displayed in the larger portion of the foldable display 320 along with the dinner reservations calendar event 750 in the top portion of the smaller portion of the foldable display 320 and the reservation information 755 in the bottom portion of the smaller portion of the foldable display 320.

According to embodiments of this disclosure, the user interface of a foldable electronic device 300 is configured to receive a variety of multi-touch inputs that correspond to various manipulations of the presentation of applications on the foldable display 310. The manipulations include but are not limited to varying the application display size, varying the application display position, entering an overview state, and bringing back an application that was most recently closed. Various examples are provided in accordance with the illustrations of FIGS. 8A though 12D. These examples are for illustration only and other embodiments could be used without departing from the scope of the present procedure.

FIGS. 8A, 8B, 8C and 8D illustrate examples of multi-touch inputs for changing from a dual screen view to a full screen view according to embodiments of this disclosure. The embodiments for changing from a dual screen view to a full screen view shown in FIGS. 8A, 8B, 8C and 8D are for illustration only and other embodiments could be used without departing from the scope of the present disclosure.

Referring to the non-limiting example of FIGS. 8A and 8B, an electronic device 300 is in a non-folded state or tablet mode. In FIG. 8A, App 1 and App 2 are being viewed side by side in the first portion 321 and the second portion 322, respectively, of the foldable display 320. A user, using a multi-touch input, places a first finger, or a first touch input, 805 in the first portion 321 of the folded display 320, or App 1, and places a second finger, or a second touch input, 810 spaced apart horizontally from the first touch input 805, in the second portion 322 of the folded display 320, or App 2. The user moves the two fingers to the right, signaling to the electronic device to display App 1 over the full screen display of the foldable display 320 as illustrated in FIG. 8B. That is, App 1 is displayed to encompass the first portion 321 and the second portion 322 of the foldable display 320.

Referring to the non-limiting example of FIGS. 8C and 8D, an electronic device 300 is in a non-folded state or tablet mode. In FIG. 8C App 1 and App 2 are being viewed side by side in the first portion 321 and the second portion 322, respectively, of the foldable display 320. A user, using a multi-touch input, places a first finger, or a first touch input, 805 in the first portion 321 of the folded display 320, or App 1 and places a second finger, or a second touch input, 810 spaced apart vertically from the first touch input 805, in the first portion 321 of the folded display 320, or App 1. The user moves the two fingers to the right and crosses over the threshold from App 1 to App 2, signaling to the electronic device to display App 1 over the full screen display of the foldable display 320 as illustrated in FIG. 8D. That is, App 1 is displayed to encompass the first portion 321 and the second portion 322 of the foldable display 320.

According to embodiments of this disclosure, the electronic device is not limited to the display configurations as illustrated in FIGS. 8A, 8B, 8C and 8D. For example, the multi-touch gesture input can originate in App 2, or the second portion 322 of the foldable display, wherein the user moves the fingers to the left such that the resulting full screen display is App 2.

FIGS. 9A, 9B, 9C and 9D illustrate examples for moving from a three screen view to a two screen view where the starting point of the multi-touch input gesture indicates which application to retain according to embodiments of this disclosure. The embodiment for moving from a three screen view to a two screen view as shown in 9A, 9B, 9C and 9D is for illustration only and other embodiments could be used without departing from the scope of the present disclosure.

Referring to the non-limiting example of FIGS. 9A and 9B, three applications are displayed on the foldable display 320 of the electronic device 300. Although three applications are illustrated for explanation, embodiments having more than three applications could be used without departing from the scope of the present disclosure. App 1 is displayed in the first portion 321 of the foldable display 320, App 2 is displayed in an upper portion of the second portion 322 of the foldable display 320 and App 3 is displayed in a lower portion of the second portion 322 of the foldable display 320. FIG. 9A illustrates a multi-touch gesture input comprising the user placing a first finger, or a first touch input, 905 in the upper portion of the second portion 322 of the folded display 320, or App 2, and places a second finger, or a second touch input, 910 spaced apart horizontally from the first touch input 905, in the upper portion of the second portion 322 of the folded display 320, or App 2. The user slides the fingers downward into the lower portion of the second portion 322 of the foldable display 320, or App 3, signaling to the electronic device to display App 2 over the full portion of the second portion 322 of the foldable display 320. FIG. 9B illustrates the resulting configuration of App 1 being displayed in the first portion 321 of the folded display 320 beside App 2, which is displayed in the second portion 322 of the foldable display 320.

Referring to the non-limiting example of FIGS. 9C and 9D, three applications are displayed on the foldable display 320 of the electronic device 300. In this example, multi-touch gesture input comprising the user placing two fingers, spaced apart horizontally as illustrated in FIG. 9C. The first finger, or first touch input, 915 is placed in the first portion 321 of the foldable display 320, or App 1. The second finger, or second touch input, 920 is placed in the lower portion of the second portion 322 of the foldable display 320, or App 3. As the user slides the fingers from right to left, the electronic device 300 is configured to display App 3 in the first portion 321 of the foldable display 320, replacing App 1. FIG. 9D illustrates the resulting display of App 3 in the first portion 321 of the foldable display 320 and display of App 2 in the second portion 322 of the foldable display 320.

According to embodiments of this disclosure, the electronic device 300 is not limited to the display configurations as illustrated in FIGS. 9A, 9B, 9C and 9D. For example, the multi-touch gesture input can originate in App 2, or the upper portion of the second portion 322 of the foldable display 320, wherein the user moves the fingers to the left resulting in App 2 being displayed in the first portion 321 of the foldable display 320 and App 3 being displayed in the second portion 322 of the foldable display 320. In addition, the multi-touch input could originate in the first portion 321 of the foldable display 320, or App 1, wherein when the user moves the fingers to the right the resulting display would be a full screen display of App 1 on the foldable display 320. As another example, the multi-touch input could originate in the first portion 321 of the foldable display 320, or App 1, wherein when the user moves the fingers to the right toward the upper part of the second portion 322, App 1 moves to the App 2 position, or the upper part of the second portion 322; App 2 moves to the App 3 position, or the lower part of the second portion 322; and App 3 moves to the App 1 position, or the first portion 321.

FIGS. 10A, 10B, 10C, 10D, 10E and 10F illustrate examples for a multi-touch input gesture swap of positions for the applications according to embodiments of this disclosure. The embodiment for gesture swapping of positions of applications as shown in FIGS. 10A, 10B, 10C, 10D, 10E and 10F is for illustration only and other embodiments could be used without departing from the scope of the present disclosure.

Figure 10A:
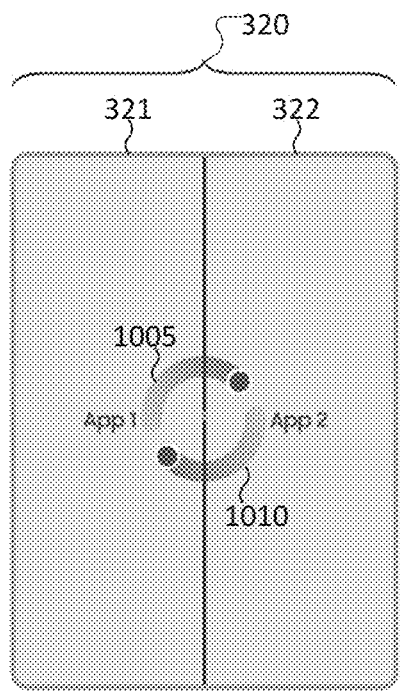
FIGS. 10A, 10B, 10C, 10D, 10E and 10F illustrate examples for a multi-touch input gesture swap of positions for the applications according to embodiments of this disclosure.
Figure 10B:
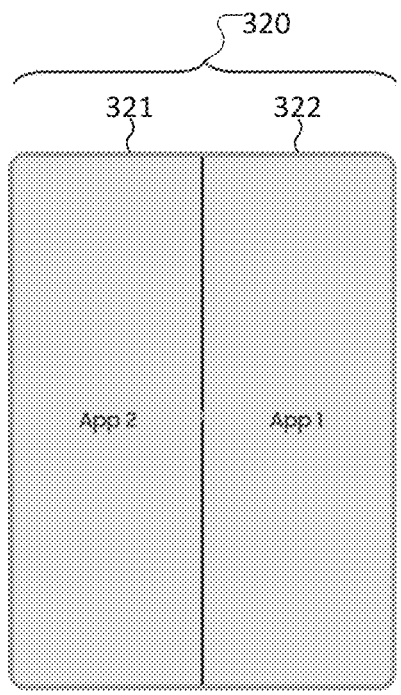

Referring to the non-limiting example of FIGS. 10A and 10B, an electronic device 300 is in a non-folded state or in tablet mode. In FIG. 10A App 1 and App 2 are being viewed side by side in the first portion 321 and the second portion 322, respectively, of the foldable display 320. A multi-touch gesture input comprises a user placing one finger, or a first touch input, 1005 in the first portion 321 of the foldable display 320, or App 1, and a second finger, or a second touch input, 1010 in the second portion 321 of the foldable display 320, or App 2. As the user rotates the fingers in a circular, clockwise, motion, moving the first touch input from App 1 to App 2 and the second touch input from App 2 to App 1, the electronic device is configured to swap the display positions of the two applications. FIG. 10B illustrates the resulting configuration wherein App 2 is displayed in the first portion 321 of the foldable display 320 and App 1 is displayed in the second portion 322 of the foldable display 320.

Figure 10C:
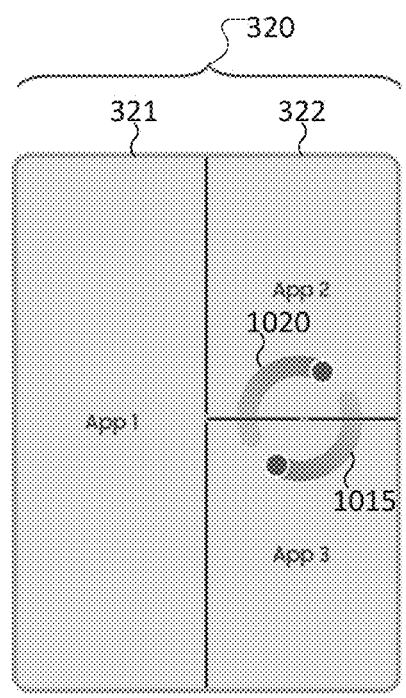
Figure 10D:
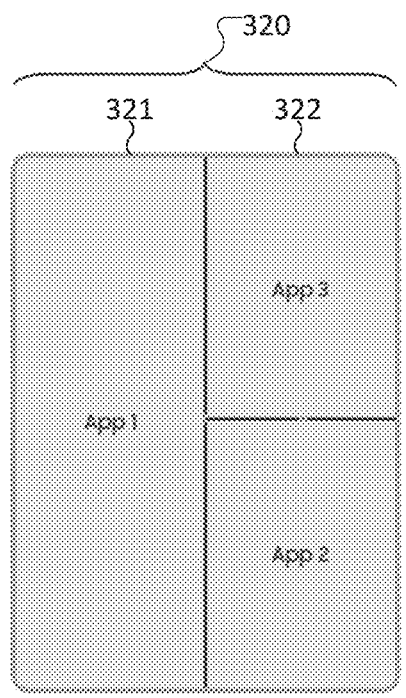

Referring to the non-limiting example of FIGS. 10C and 10D, an electronic device 300 is in a non-folded state or in tablet mode and three applications are displayed on the foldable display 320. In FIG. 10C App 1 is displayed in the first portion 321 of the folded display 320, App 2 is displayed in an upper portion of the second portion 322 of the folded display 320 and App 3 is displayed in a lower portion of the second portion 322 of the folded display 320. A multi-touch gesture input comprises a user placing one finger, or a first touch input, 1015 in the upper portion of the second portion 322 of the foldable display 320, or App 2, and a second finger, or a second touch input, 1020 in the lower portion of the second portion 321 of the foldable display 320, or App 3. As the user rotates the fingers in a circular, clockwise, motion, moving the first touch input 1015 from App 2 to App 3 and the second touch input 1020 from App 3 to App 2, the electronic device is configured to swap the display positions of the two applications. FIG. 10D illustrates the resulting configuration wherein App 2 is displayed in the lower portion of the second portion 322 of the foldable display 320 and App 3 is displayed in the upper portion of the second portion 322 of the foldable display 320.

Figures 10E, 10F:
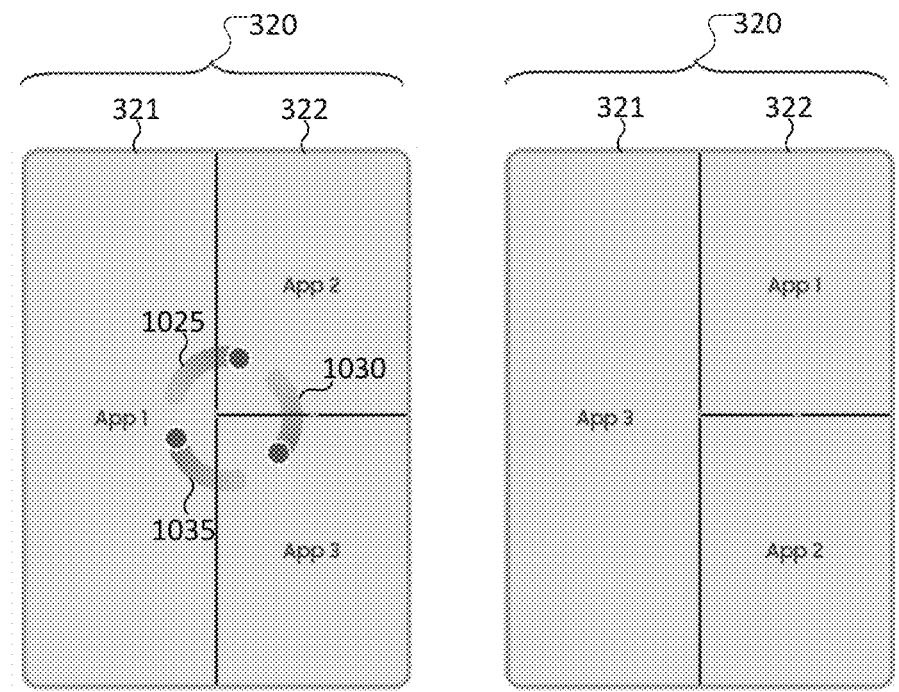

Referring to the non-limiting example of FIGS. 10E and 10F, an electronic device 300 is in a non-folded state or in tablet mode and three application are displayed on the foldable display 320. In FIG. 10E App 1 is displayed in the first portion 321 of the folded display 320, App 2 is displayed in an upper portion of the second portion 322 of the folded display 320 and App 3 is displayed in a lower portion of the second portion 322 of the folded display 320. A multi-touch gesture input comprises a user placing one finger, or a first touch input, 1025 in the first portion 321 of the foldable display 320, or App 1; a second finger, or a second touch input, 1030 in the upper portion of the second portion 321 of the foldable display 320, or App 2; and a third finger, or third touch input, 1035 in the lower portion of the second portion 321 of the foldable display 320 or App 3. As the user rotates the fingers in a circular, clockwise, motion, moving the first touch input 1025 from App 1 to App 2 and the second touch input 1030 from App 2 to App 3 and the third touch input 1035 from App 3 to App 1, the electronic device is configured to rotate the display positions of the three applications. FIG. 10F illustrates the resulting configuration wherein App 3 is displayed in the first portion 321 and App 1 is displayed in the upper portion of the second portion 322 and App 2 is displayed in the lower portion of the second portion 322 of the foldable display 320.

The multi-touch gesture to swap applications is not limited to the examples as disclosed above. For example, the multi-touch gesture may move in a counter-clockwise direction to signal swapping of application display positions. Moreover, other variations and embodiments, including swapping more than two applications at a time may be contemplated without departing from the scope of this disclosure.

FIGS. 11A, 11B, 11C and 11D illustrate examples of multi-touch input gestures to go into an overview state according to embodiments of this disclosure. The embodiment for gestures to go into an overview state as shown in FIGS. 11A, 11B, 11C and 11D is for illustration only and other embodiments could be used without departing from the scope of the present disclosure.

Figures 11A, 11B:
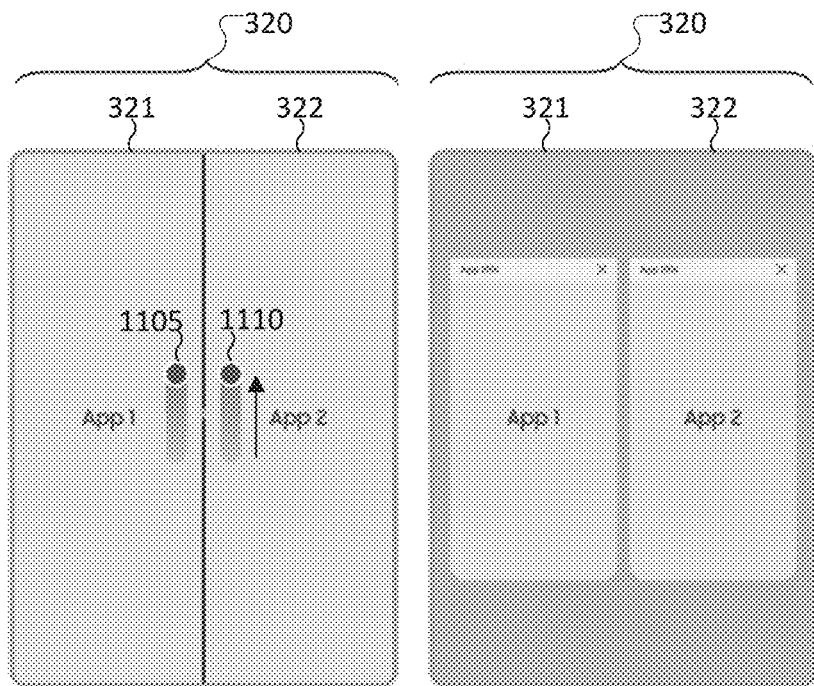
FIGS. 11A, 11B, 11C and 11D illustrate examples of multi-touch input gestures to go into an overview state according to embodiments of this disclosure.

Referring to the non-limiting example of FIGS. 11A and 11B, an electronic device 300 is in a non-folded state or tablet mode. In FIG. 11A, App 1 and App 2 are being viewed side by side in the first portion 321 and the second portion 322, respectively, of the foldable display 320. A user places a first finger, or a first touch input, 1105 in the first portion 321 of the foldable display 320 or App 1 and a second finger, or a second touch input, 1110 in the second portion 322 of the foldable display 320 or App 2. The user slides each finger upward as illustrated in FIG. 11A. FIG. 11B illustrates the resulting screen view, wherein App 1 and App 2 are displayed as overview screens in the first portion 321 and second portion 322, respectively, of the foldable display 320.

Figures 11C, 11D:
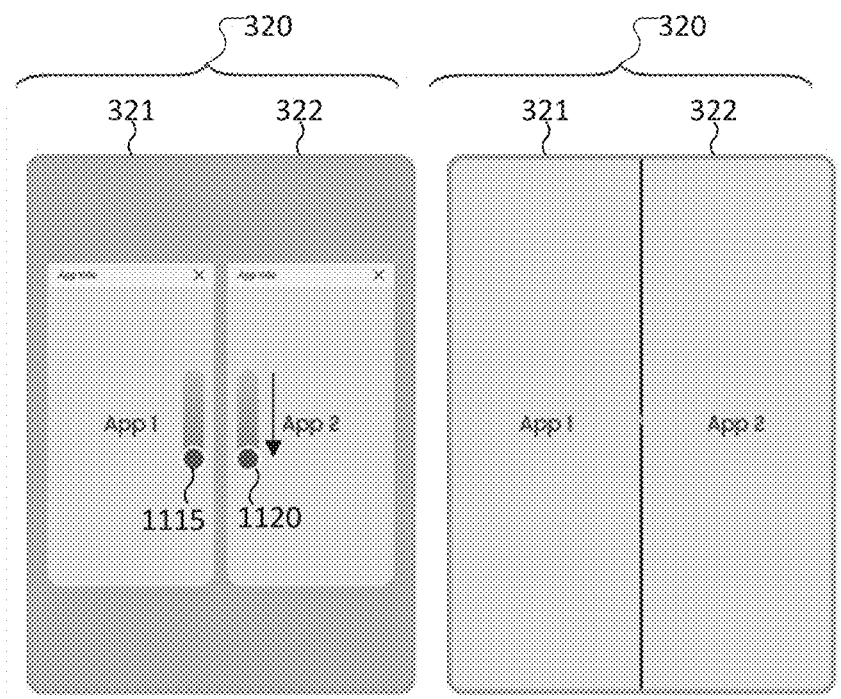

Referring to the non-limiting example of FIGS. 11C and 11D, an electronic device 300 is in a non-folded state or tablet mode. In FIG. 11C App 1 and App 2 are displayed as overview screens, viewed side by side in the first portion 321 and the second portion 322, respectively, of the foldable display 320. A user places a first finger, or a first touch input, 1115 in the App 1 overview screen and a second finger, or a second touch input, 1110 in the App 2 overview screen. The user slides each finger downward as illustrated in FIG. 11C. FIG. 11D illustrates the resulting screen view wherein App 1 and App 2 are displayed side by side in the first portion 321 and the second portion 322, respectively, of the foldable display 320.

FIGS. 12A, 12B, 12C and 12D illustrate examples of multi-touch input gestures to bring back the last application that was closed according to embodiments of this disclosure. The embodiment for gestures to bring back the last application that was closed as shown in FIGS. 12A, 12B, 12C and 12D is for illustration only and other embodiments could be used without departing from the scope of the present disclosure.

Figure 12A:
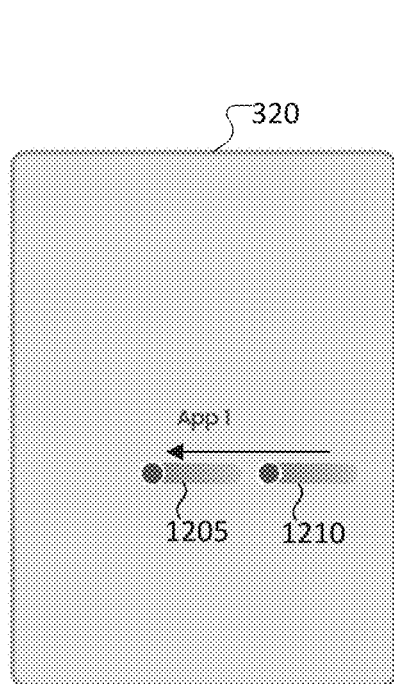
FIGS. 12A, 12B, 12C and 12D illustrate examples of multi-touch input gestures to bring back the last application that was closed according to embodiments of this disclosure.
Figure 12B:
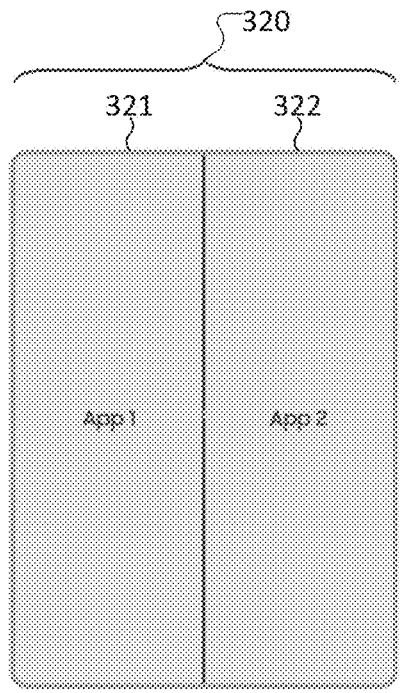

Referring to the non-limiting example of FIGS. 12A and 12B, an electronic device 300 is in a non-folded state or tablet mode. FIG. 12A illustrates that App 1 is displayed as a full screen of the foldable display 320. The user places a first finger, or first touch input, 1205 on App 1 and places a second finger, or second touch input, 1210 spaced apart from the first touch input 1205 horizontally on App 1. The user slides the fingers from right to left. FIG. 12B illustrates that as a result of the finger movement, App 1 is displayed in the first portion 321 of the foldable display 320 and App 2 is displayed in the second portion 322 of the foldable display 320. According to embodiments of this disclosure, App 2 is displayed because it was the last application closed as a result of a multi-touch input configured to display App 1 as a full screen, such as was described in reference to FIGS. 8A-8B.

Figure 12C:
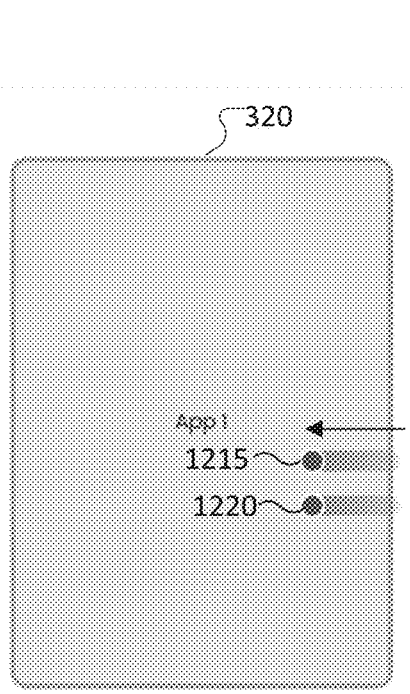
Figure 12D:
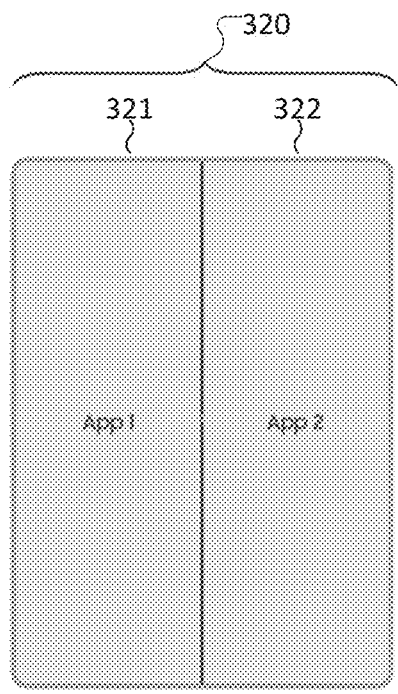

Referring to the non-limiting example of FIGS. 12C and 12D the same result may be accomplished with another multi-touch configuration. As illustrated in FIG. 12C, a first finger, or first touch input, 1215 is placed on the edge of App 1 and a second finger, or second touch input, 1220 space apart from the first touch input 1215 vertically on the edge of App 1. The user slides the fingers from right to left. FIG. 12D illustrates that as a result of the finger movement, App 1 is displayed in the first portion 321 of the foldable display 320 and App 2 is displayed in the second portion 322 of the foldable display 320. According to embodiments of this disclosure, App 2 is displayed because it was the last application closed as a result of a multi-touch input configured to display App 1 as a full screen such as was described in reference to FIGS. 8A-8B.

Figure 13:
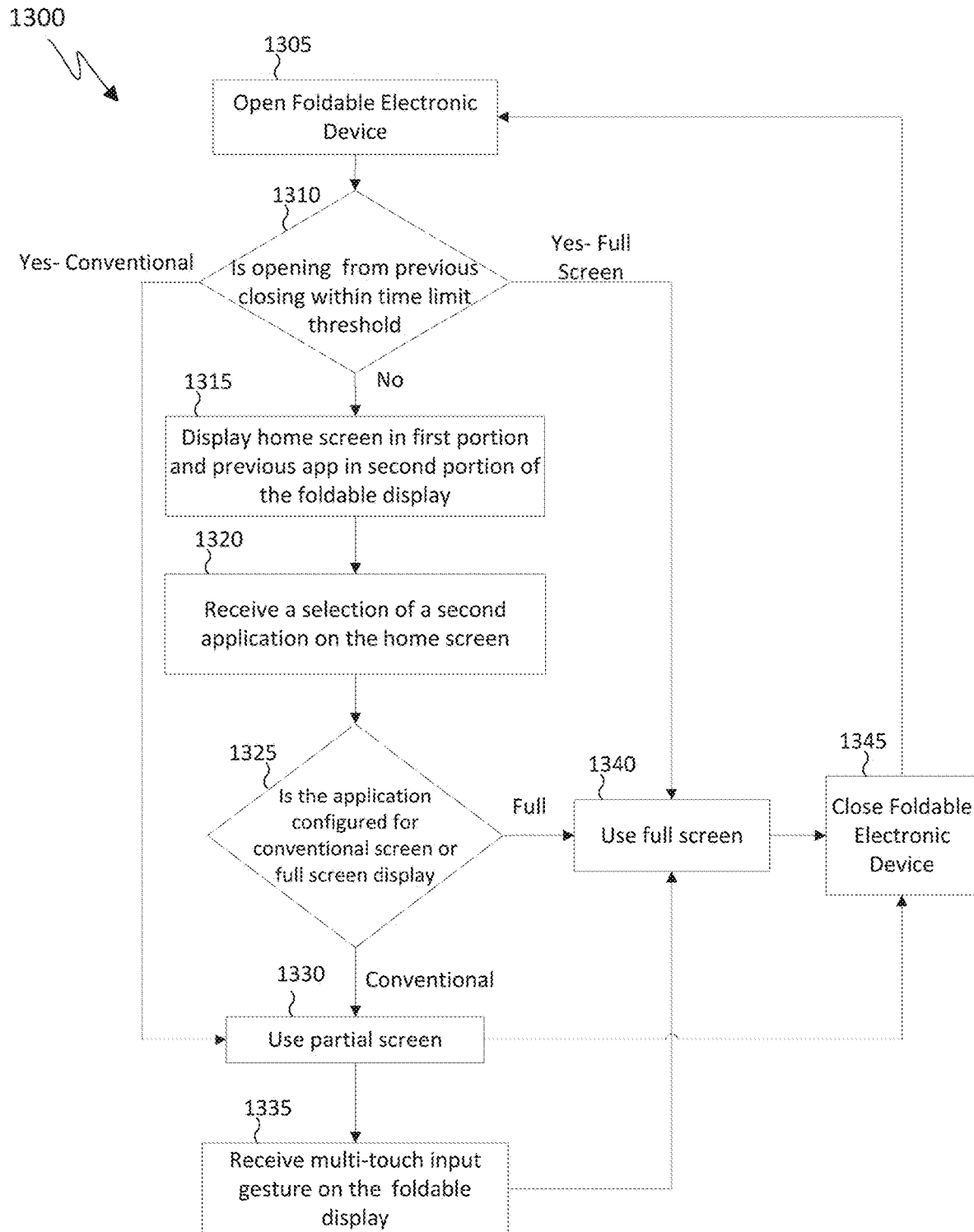
FIG. 13 is a block diagram that illustrates an example method for a user interface of an application to be fully or partially displayed on a foldable display based on a time duration since an electronic device was last opened according to embodiments of this disclosure.

FIG. 13 is a block diagram that illustrates an example method 1300 for a user interface of an application to be fully or partially displayed on a foldable display based on a time duration since an electronic device was last opened according to embodiments of this disclosure. While the block diagram depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps.

In block 1305, an electronic device 300 is configured to detect an opening of a foldable display 320. An opening of the foldable display 320 is when the foldable display 320 goes from a folded state to an unfolded state. In block 1310, the electronic device 300 is configured to determine whether a length of time since the last time the foldable display was closed is within a predetermined amount of time or threshold. A closing of the foldable display 320 is when the foldable display 320 goes from an unfolded state to a folded state. If the length of time is within the threshold, the foldable display 320 will display the user interface of the last application according to the resolution restrictions of the application. For example, if the user interface of the application being displayed before the foldable display 320 was closed has resolution restrictions that require a conventional screen, i.e. a small screen or mobile screen configuration, the process moves to step 1330 where the user interface of the application will be displayed on only a portion of the foldable display 320. On the other hand, if the user interface of the application being displayed before the foldable display 320 was closed has a resolution restriction that allows the application to be viewed on a large screen, or tablet screen configuration, the process moves to step 1340 where the user interface of the application will be displayed on the full screen of the foldable display 320. If the length of time since the last time the foldable display 320 was closed exceeds the threshold the process proceeds to block 1315.

According to embodiments of this disclosure, as shown in block 1315, the foldable display 320 is configured to display a home screen, or home launcher, in the first portion 321 of the foldable display 320 and the user interface of the application that was last opened on the second portion 322 of the foldable display 320 if the length of time since the previous closing exceeded the threshold.

In block 1320, the electronic device 300 receives a selection of a second application on the home screen. In block 1325, the electronic device 300 determines whether the selected second application is configured for conventional screen display or full screen display. If the selected application has resolution restrictions that require a conventional screen, i.e. a small screen or mobile screen configuration, the process moves to step 1330 where the user interface of the application will be displayed on only a portion of the foldable display 320. The user interface of the selected second application will replace the home screen in the first portion 321 of the foldable display 320. On the other hand, if the selected application has a resolution restriction that allows the application to be viewed on a large screen, or tablet mode, the process moves to step 1340 where the user interface of the application will be displayed on the full screen of the foldable display 320.

In block 1335, the electronic device 300 receives a multi-touch input gesture on the foldable display 320. The multi-touch input gesture allows for manipulation of the displayed applications including application display size, application display position, entering an application overview state and retrieving a closed application. Various examples of the manipulation of the displayed applications were previously provided in accordance with the illustrations of FIGS. 8A though 12D.

In block 1340, the electronic device 300 displays the user interface of the selected application on the full screen of the foldable display 320 according to the determination that the application is configured for full screen display in block 1325. In block 1345, the user closes the foldable electronic device 300 and the length of time between the closing of the electronic device 300 and the re-opening of the electronic device 300 will be re-determined at block 1305.

Figure 14:
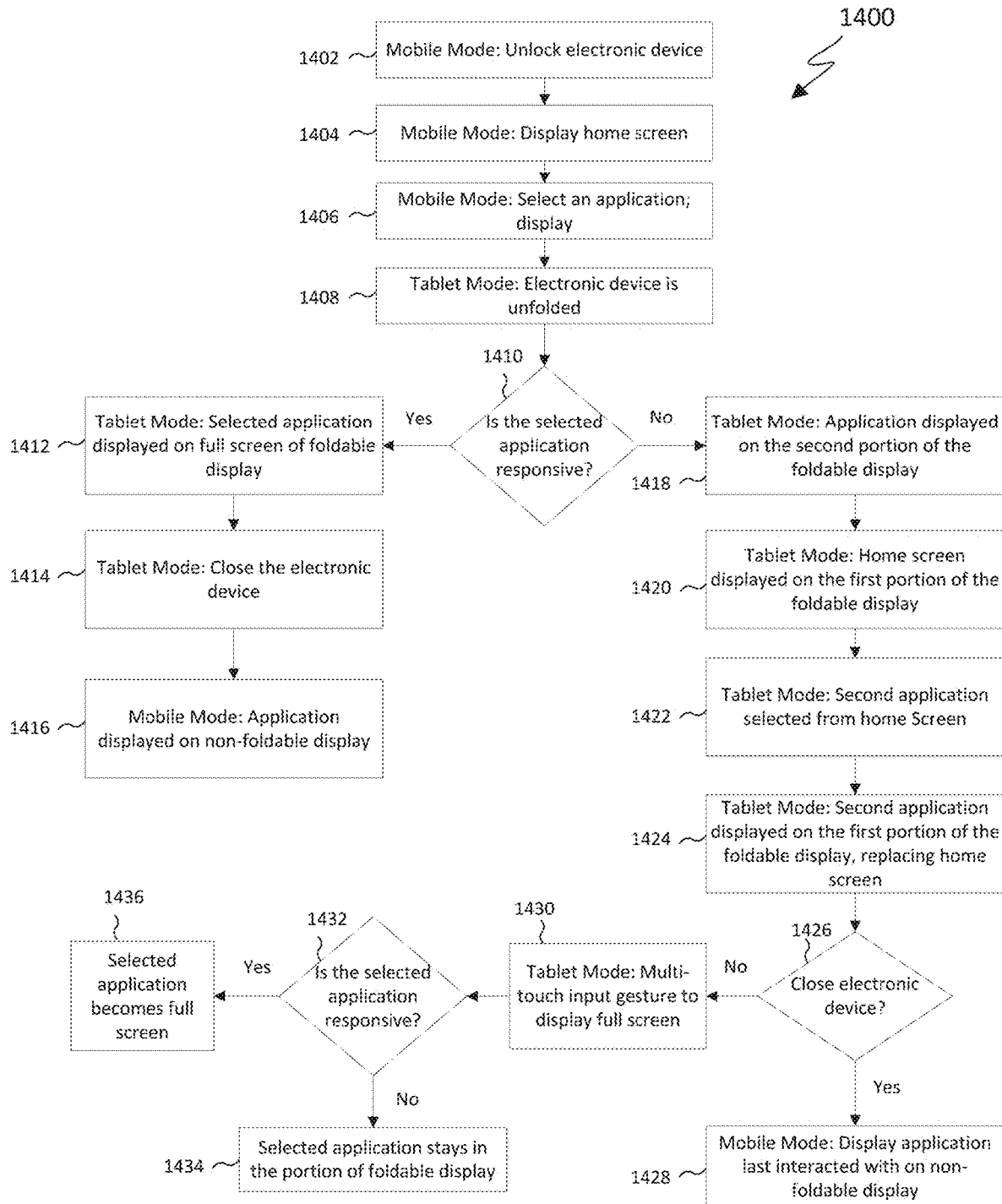
FIG. 14 is a block diagram that illustrates an example method displaying a user interface of an application either fully or partially on the foldable display according to embodiments of this disclosure.

FIG. 14 is a block diagram that illustrates an example method 1400 of displaying a user interface of an application either fully or partially on the foldable display 320 according to embodiments of this disclosure. While the block diagram depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps.

In block 1402, an electronic device 300 is in a folded state, or mobile mode. The non-foldable display 315 presents to the user that the electronic device 300 is currently locked. The user provides an input to unlock the electronic device 300. In block 1404, the electronic device 300 is no longer locked and still in mobile mode. The non-foldable display 315 displays a home screen, or home launcher, that comprises a display of a plurality of application icons. In block 1406, the user selects an application icon which corresponds to an application program from the home screen on the non-foldable display 315. In block 1408, the user opens the electronic device 300. The electronic device 300 is now in an unfolded state, or tablet mode.

In block 1410, the electronic device 300 determines whether the selected application is a responsive application. A responsive application is an application that has a user interface that is configured to be displayed on both a small screen (also referred to as a conventional screen such as on a mobile device) or a large screen (also referred to as the full screen of the foldable display). In other words, the user interface of a responsive application has variable screen sizes. If the selected application is responsive the method proceeds to block 1412. If the selected application is non-responsive the method proceeds to block 1418.

Following the method according to the selected application being responsive, in block 1412, the electronic device 300 is configured to display the user interface of the responsive selected application on the full screen of the foldable display 320 according to its size restrictions (see the example illustrated in FIG. 6 of the application supporting full screen layout).

In block 1414, the user closes the electronic device 300. In block 1416, the user interface of the application that was being displayed on the full screen of the foldable display 320 is displayed on the non-foldable display 315 as the electronic device 300 enters mobile mode.

Now following the method according to the selected application being non-responsive, in block 1418, the user interface of the non-responsive selected application is displayed on the second portion 322 of the foldable display 320. In block 1420, the electronic device 300 is configured to display the home screen on the first portion 321 of the foldable display 320 (see the example illustrate in FIG. 6 of the application not supporting the full screen layout). The home screen and the user interface of the non-responsive selected application are displayed side by side on the foldable display 320. In block 1422, the user selects a second application from the home screen displayed in the first portion 321 of the foldable display 320. The second application opens and the user interface of the second application is displayed in the first portion 321 of the foldable display 320, replacing the home screen.

In block 1426, the user chooses to close the electronic device 1426 or the user proceeds to interact with the applications displayed on the foldable display 320. If the user chooses to close the electronic device 300, the process proceeds to block 1428. If the user chooses to keep interacting with the applications while in tablet mode, the process proceeds to block 1430.

Following the method according to the user closing the electronic device 300, in block 1428, the user closes the electronic device 300. Upon the electronic device closing, the electronic device 300 is configured to display on the non-foldable display 315 the user interface of the application that was last interacted with by the user on the non-foldable display 320 in the folded state, or mobile mode.

Next, following the method according to the user choosing to not close the electronic device 300, in block 1430, the user inputs a multi-touch gesture on the foldable display screen 320, such as the example described in FIGS. 8A-8D. The multi-touch input gesture allows the user to choose an application from multiple applications that are being displayed in partial portions of the foldable display 320 to be displayed on the full screen of the foldable display 320. In block 1432, the electronic device 300 is configured to determine whether the application selected by the multi-touch input gesture is a responsive application. If the application is non-responsive the process proceeds to block 1434. If the application is responsive the process proceeds to block 1436.

In block 1434, the user interface of the non-responsive selected application does not become full screen and remains displayed in the portion of the foldable display 320 as it was before the multi-touch input gesture. In block 1436, the user interface of the responsive selected application is displayed on the full screen of the foldable display 320 and the other applications are hidden from view.

Figure 15:
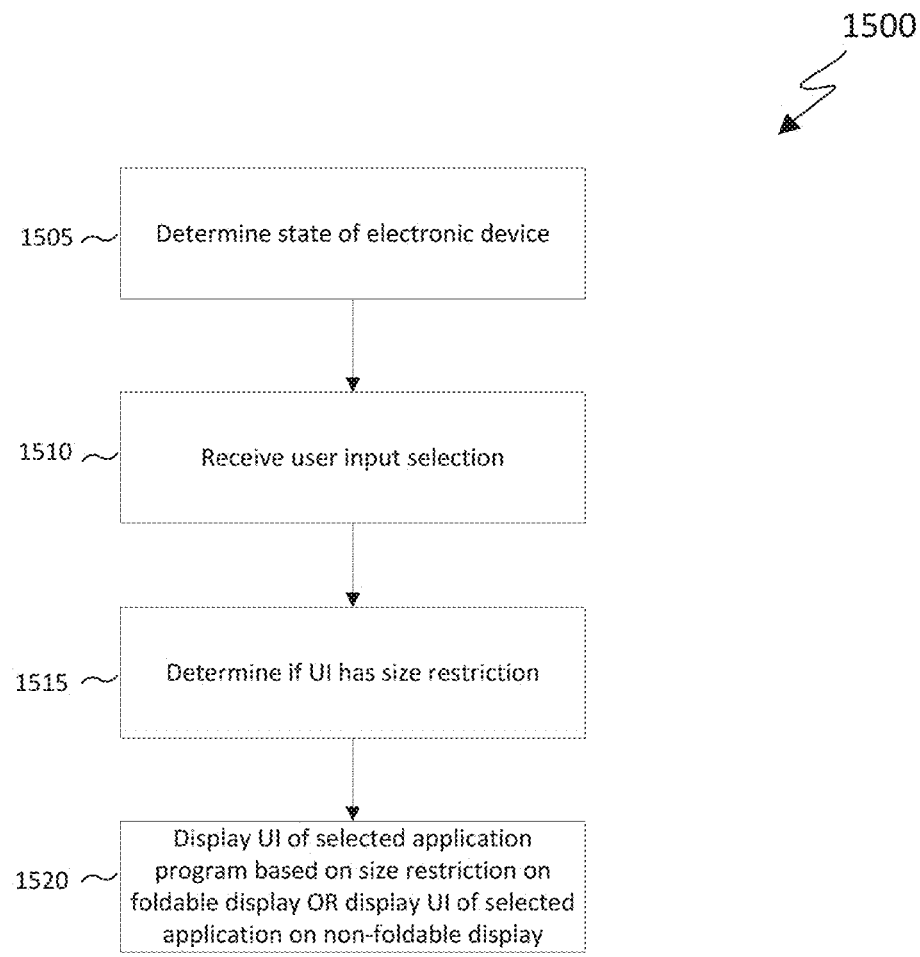
FIG. 15 is a block diagram that illustrates an example method of displaying a user interface of an application on the non-foldable display or the foldable display according to embodiments of this disclosure.

FIG. 15 is a block diagram that illustrates an example method 1500 of displaying a user interface of an application on the non-foldable display 315 or the foldable display 320 according to embodiments of this disclosure. While the block diagram depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps.

In block 1505, the electronic device 300 is configured to determine its state. The state can be either a folded, or closed, state, or an unfolded, or open, state. In block 1510, the electronic device 300 receives a user input selection of an application program on a home screen of the electronic device 300. The user input selection of an application can be received from a user through the touchscreen of the non-foldable display 315 or the touchscreen of the foldable display 320. In block 1515, the electronic device 300 determines if the user interface of the selected application program has size restrictions. In block 1520, the electronic device 300 executes instructions to display the user interface of the selected application, based on the size restriction and the state of the foldable device, on either the foldable display or the non-foldable display. For example, if the foldable device is in an unfolded state the user interface of the selected application will be displayed on at least a portion of the foldable display 320 based on the size restriction. As another example, if the foldable electronic device 300 is in the folded state, the user interface of the selected application will be displayed on the non-foldable display 315 in response to receiving the selection of the application through the touchscreen of the non-foldable display 315.

Although various features have been shown in the figures and described above, various changes may be made to the figures. For example, the size, shape, arrangement, and layout of components shown in FIGS. 1 through 15, are for illustration only. Each component could have any suitable size, shape, and dimensions, and multiple components could have any suitable arrangement and layout. Also, various components in FIGS. 1 through 15 could be combined, further subdivided, or omitted and additional components could be added according to particular needs. Further, each component in a device or system could be implemented using any suitable structure(s) for performing the described function(s). In addition, whiles FIGS. 13, 14 and 15 illustrate various series of steps, various steps in FIGS. 13, 14 and 15 could overlap, occur in parallel, occur multiple times, or occur in a different order.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An electronic device comprising:
   a foldable housing including:
     a hinge structure;
     a first housing structure coupled to the hinge structure; and
     a second housing structure coupled to the hinge structure, wherein the second housing structure is foldable and unfoldable with respect to the first housing structure about the hinge structure, wherein the second housing structure is folded onto the first housing structure in a folded state, and wherein the second housing structure forms a substantially planar surface with the first housing structure in an unfolded state;
   a foldable display including a first portion positioned in the first housing structure and a second portion positioned in the second housing structure;
   a processor operatively connected to the foldable display; and
   a memory operatively connected to the processor, wherein the memory stores multiple application programs;
   wherein the foldable display is configured to selectively (i) present a single user interface associated with a single one of the multiple application programs and (ii) simultaneously present multiple user interfaces associated with two or more of the multiple application programs; and
   wherein the memory further stores instructions that, when executed, cause the processor to:
     receive a multi-touch user input comprising a first touch input and a simultaneous second touch input while the foldable display presents a first user interface of the multiple user interfaces on the first portion of the foldable display and a second user interface of the multiple user interfaces on the second portion of the foldable display such that a boundary between the first user interface and the second user interface coincides with a display boundary between the first portion and the second portion; and
     in response to at least one of the first touch input and the second touch input crossing the display boundary and the boundary between the first user interface and the second user interface, control which user interface or user interfaces of the first and second user interfaces are presented on the foldable display and where the user interface or user interfaces are presented on the foldable display.

2. The electronic device of claim 1, wherein:
   the foldable display is configured to present the first and second user interfaces side-by-side; and
   in response to the multi-touch user input, the processor is configured to control the foldable display in order to enlarge the first user interface and remove the second user interface.

3. The electronic device of claim 2, wherein the processor is configured, in response to the multi-touch user input, to one of:
   control the foldable display to present the first user interface on an entirety of the foldable display; or
   control the foldable display to present the first user interface on both (i) a portion of the foldable display on which the first user interface was previously presented and (ii) a portion of the foldable display on which the second user interface was previously presented.

4. The electronic device of claim 1, wherein:
   the foldable display is configured to present the first and second user interfaces side-by-side; and
   in response to the multi-touch user input, the processor is configured to control the foldable display in order to reposition locations where the first and second user interfaces are presented on the foldable display.

5. The electronic device of claim 4, wherein the processor is configured, in response to the multi-touch user input, to one of:
   control the foldable display to swap the locations where the first and second user interfaces are being presented on the foldable display; or control the foldable display to rotate the locations where at least three user interfaces, including the first and second user interfaces and a third user interface, are being presented on the foldable display.

6. The electronic device of claim 1, wherein:
the foldable display is configured to present the first and second user interfaces side-by-side; and
in response to the multi-touch user input, the processor is configured to control the foldable display in order to present the first and second user interfaces as overview screens on the foldable display, each overview screen smaller than the respective user interface.

7. The electronic device of claim 6, wherein:
the memory further stores instructions that, when executed, cause the processor to receive a second multi-touch user input; and
in response to the second multi-touch user input, the processor is configured to control the foldable display in order to remove the overview screens and present the first and second user interfaces side-by-side.

8. The electronic device of claim 1, wherein:
the foldable display is configured to present a third user interface; and
in response to a second multi-touch user input, the processor is configured to control the foldable display in order to shrink the third user interface on the foldable display and present a fourth user interface along with the third user interface on the foldable display.

9. The electronic device of claim 8, wherein the fourth user interface is associated with an application that was most-recently closed.

10. The electronic device of claim 1, wherein the memory further stores instructions that, when executed, cause the processor to:
receive a second user input to select a specified application program among the multiple application programs in the folded state;
detect a change from the folded state to the unfolded state;
determine whether the specified application program has a user interface size restriction; and
in the unfolded state, present the user interface of the specified application program on at least a portion of the foldable display based at least partly on the user interface size restriction.

11. A method comprising:
executing multiple application programs using a processor of an electronic device, the electronic device also comprising a foldable housing and a foldable display;
presenting user interfaces of the multiple application programs on the foldable display, the foldable display including a first portion and a second portion, the foldable display configured to selectively (i) present a single user interface associated with a single one of the multiple application programs and (ii) simultaneously present multiple user interfaces associated with two or more of the multiple application programs;
receiving a multi-touch user input comprising a first touch input and a simultaneous second touch input while the foldable display presents a first user interface of the multiple user interfaces on the first portion of the foldable display and a second user interface of the multiple user interfaces on the second portion of the foldable display such that a boundary between the first user interface and the second user interface coincides with a display boundary between the first portion and the second portion; and in response to at least one of the first touch input and the second touch input crossing the display boundary and the boundary between the first user interface and the second user interface, controlling which user interface or user interfaces of the first and second user interfaces are presented on the foldable display and where the user interface or user interfaces are presented on the foldable display.

12. The method of claim 11, wherein:
the foldable display is configured to present the first and second user interfaces side-by-side; and
in response to the multi-touch user input, the processor controls the foldable display in order to enlarge the first user interface and remove the second user interface.

13. The method of claim 12, wherein the multi-touch user input causes the processor to one of:
control the foldable display to present the first user interface on an entirety of the foldable display; or
control the foldable display to present the first user interface on both (i) a portion of the foldable display on which the first user interface was previously presented and (ii) a portion of the foldable display on which the second user interface was previously presented.

14. The method of claim 11, wherein:
the foldable display is configured to present the first and second user interfaces side-by-side; and
in response to the multi-touch user input, the processor controls the foldable display in order to reposition locations where the first and second user interfaces are presented on the foldable display.

15. The method of claim 14, wherein the multi-touch user input causes the processor to one of:
control the foldable display to swap the locations where the first and second user interfaces are being presented on the foldable display; or
control the foldable display to rotate the locations where at least three user interfaces, including the first and second user interfaces and a third user interface, are being presented on the foldable display.

16. The method of claim 11, wherein:
the foldable display is configured to present the first and second user interfaces side-by-side; and
in response to the multi-touch user input, the processor controls the foldable display in order to present the first and second user interfaces as overview screens on the foldable display, each overview screen smaller than the respective user interface.

17. The method of claim 16, wherein:
the method further comprises receiving a second multi-touch user input; and
in response to the second multi-touch user input, the processor controls the foldable display in order to remove the overview screens and present the first and second user interfaces side-by-side.

18. The method of claim 11, wherein:
the foldable display is configured to present a third user interface;
the method further comprises receiving a second multi-touch user input; and
in response to the second multi-touch user input, the processor controls the foldable display in order to shrink the third user interface on the foldable display and present a fourth user interface along with the third user interface on the foldable display.

19. The method of claim 18, wherein the fourth user interface is associated with an application that was most-recently closed.

20. A non-transitory computer readable medium containing instructions that when executed cause a processor of an electronic device, which also comprises a foldable housing and a foldable display, to:
- execute multiple application programs;
- present user interfaces of the multiple application programs on the foldable display, the foldable display including a first portion and a second portion, the foldable display configured to selectively (i) present a single user interface associated with a single one of the multiple application programs and (ii) simultaneously present multiple user interfaces associated with two or more of the multiple application programs;
- receive a multi-touch user input comprising a first touch input and a simultaneous second touch input while the foldable display presents a first user interface of the multiple user interfaces on the first portion of the foldable display and a second user interface of the multiple user interfaces on the second portion of the foldable display such that a boundary between the first user interface and the second user interface coincides with a display boundary between the first portion and the second portion; and
- in response to at least one of the first touch input and the second touch input crossing the display boundary and the boundary between the first user interface and the second user interface, control which user interface or user interfaces of the first and second user interfaces are presented on the foldable display and where the user interface or user interfaces are presented on the foldable display.

* * * * *